A. SMITH.
COMPUTING AND RECORDING MACHINE.
APPLICATION FILED MAY 17, 1920.

1,426,419. Patented Aug. 22, 1922.
9 SHEETS—SHEET 1.

Inventor.
Abraham Smith
By J. C. Mittinger
attys

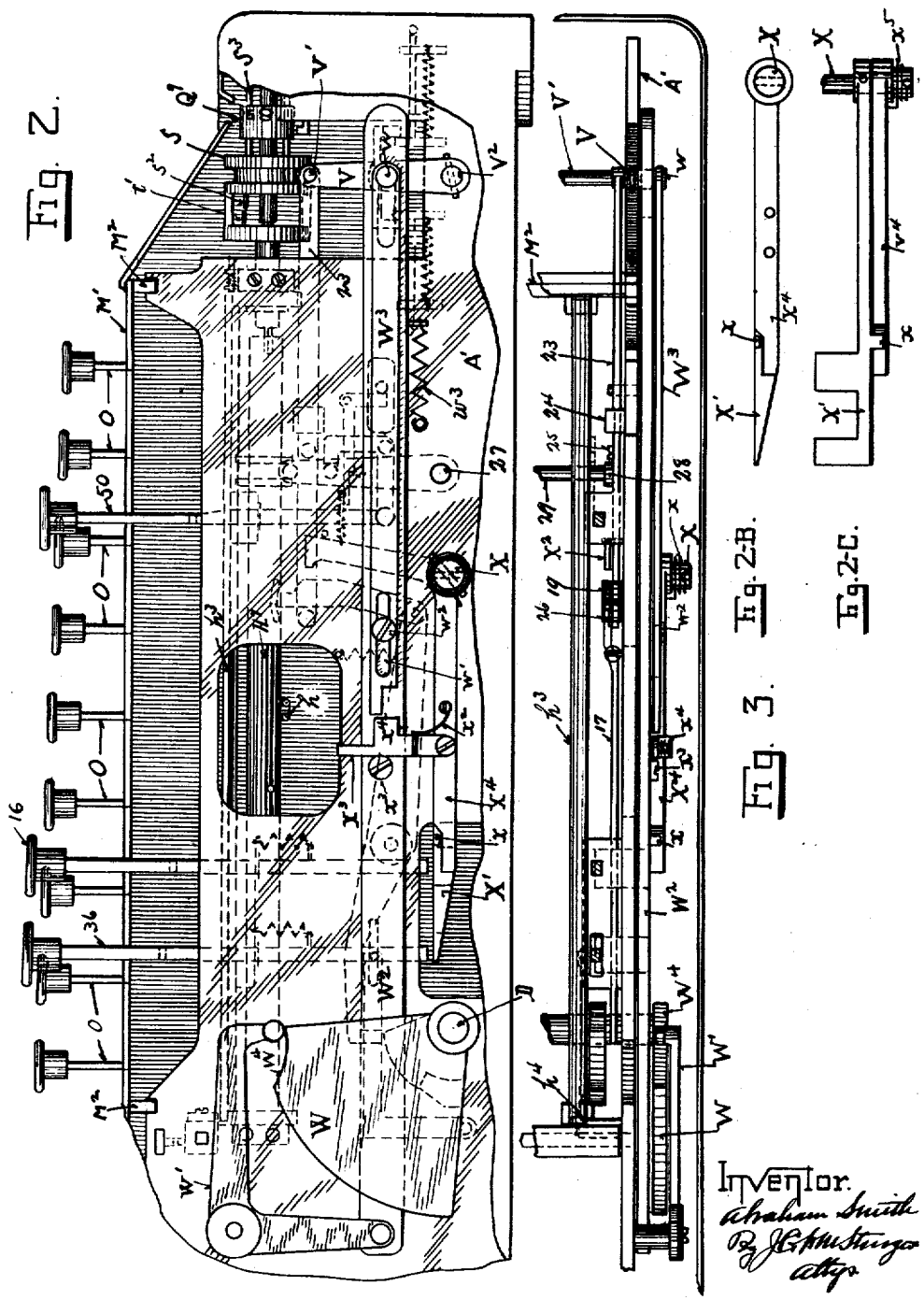

A. SMITH.
COMPUTING AND RECORDING MACHINE.
APPLICATION FILED MAY 17, 1920.
1,426,419.
Patented Aug. 22, 1922.
9 SHEETS—SHEET 3.
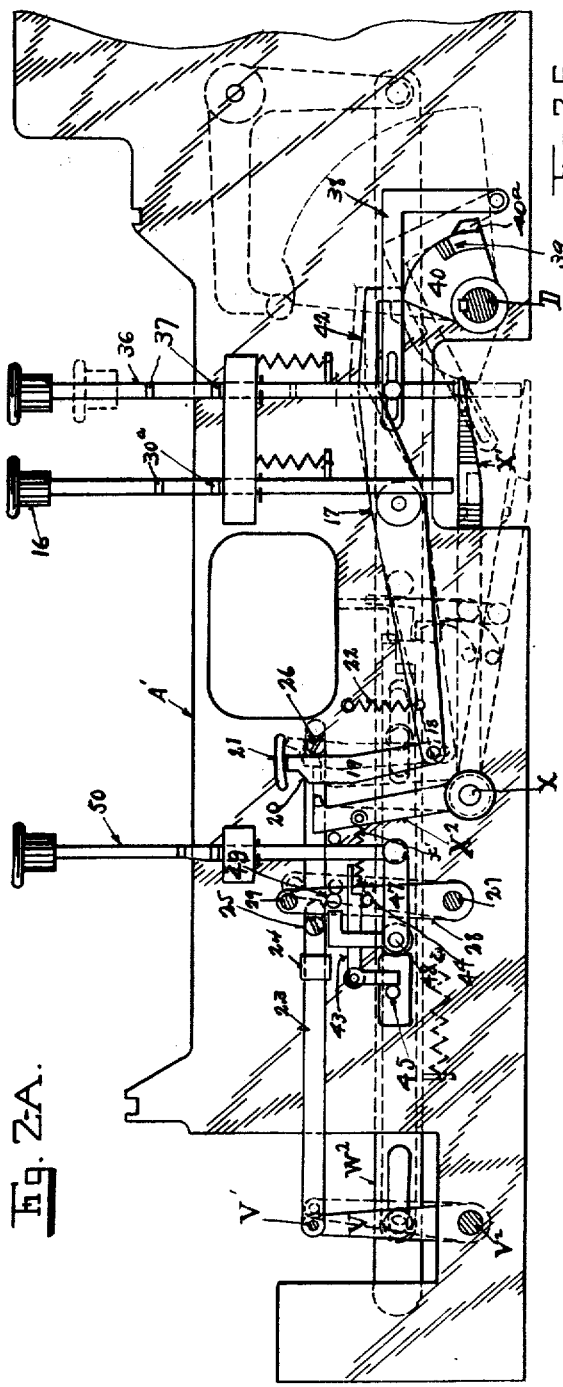
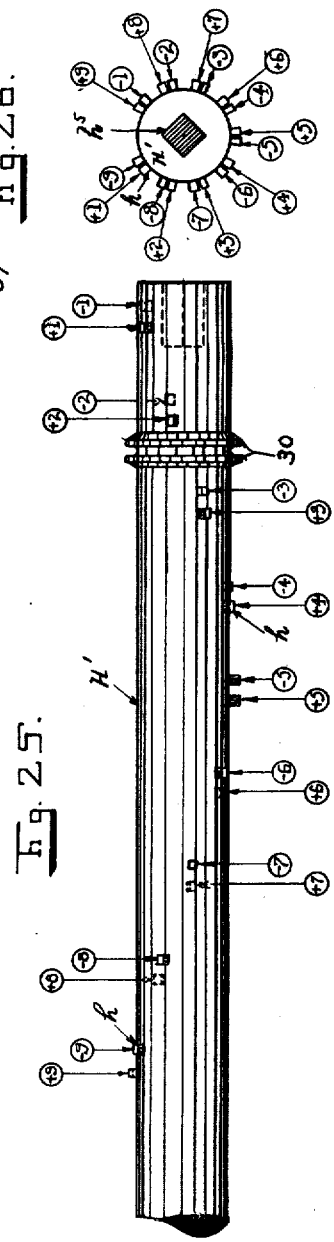
Inventor.
Abraham Smith
By J C H M Sturgeon
attys

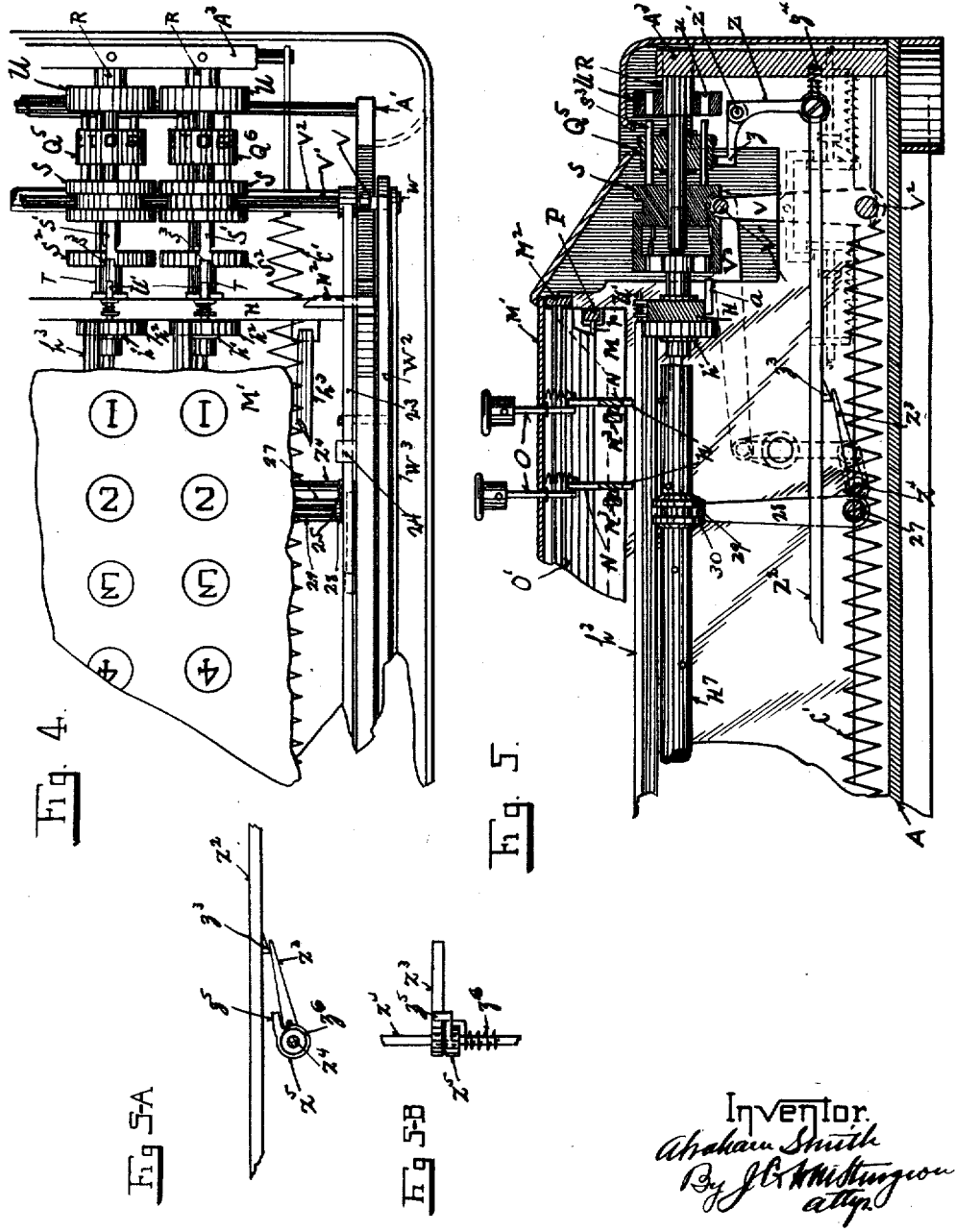

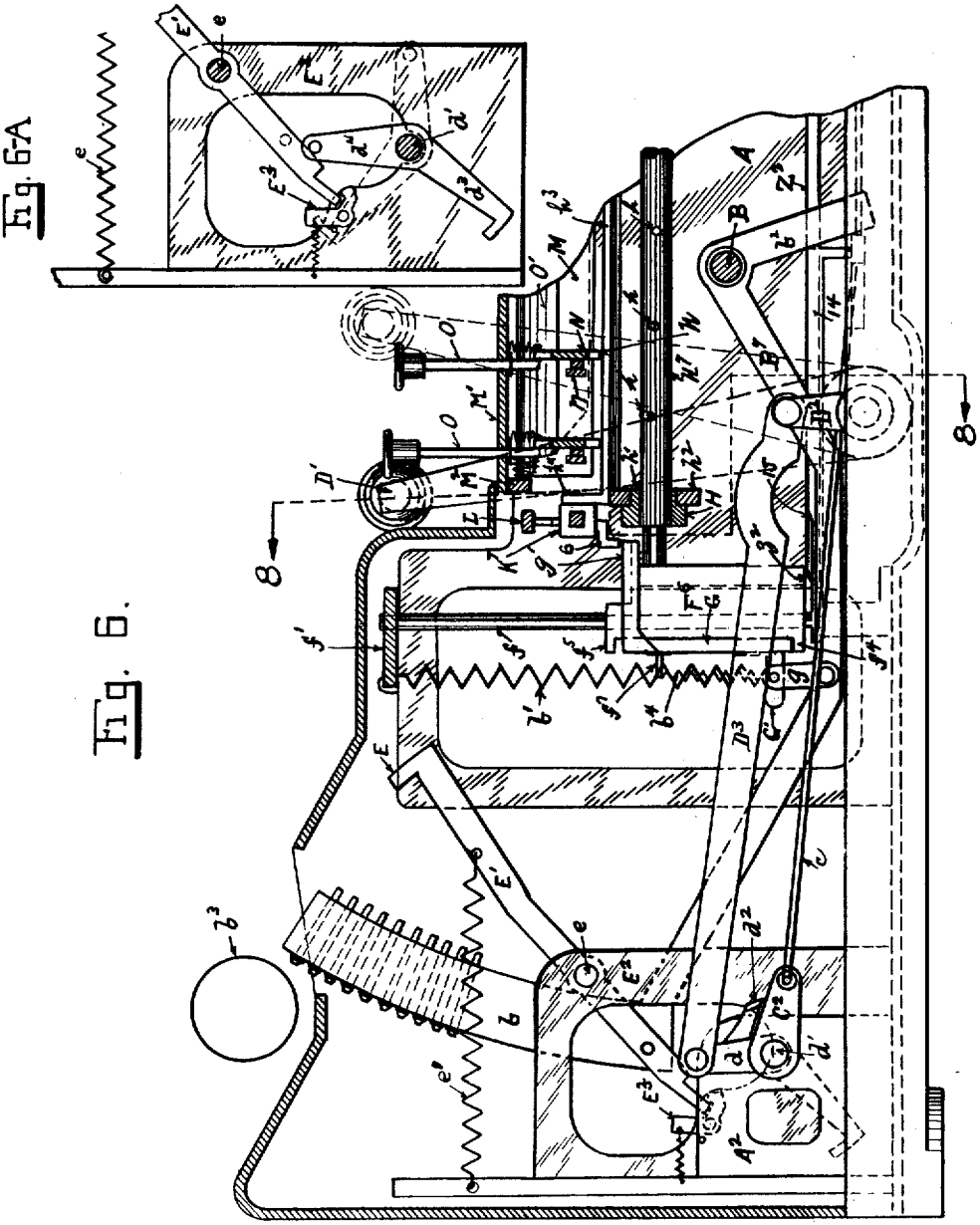

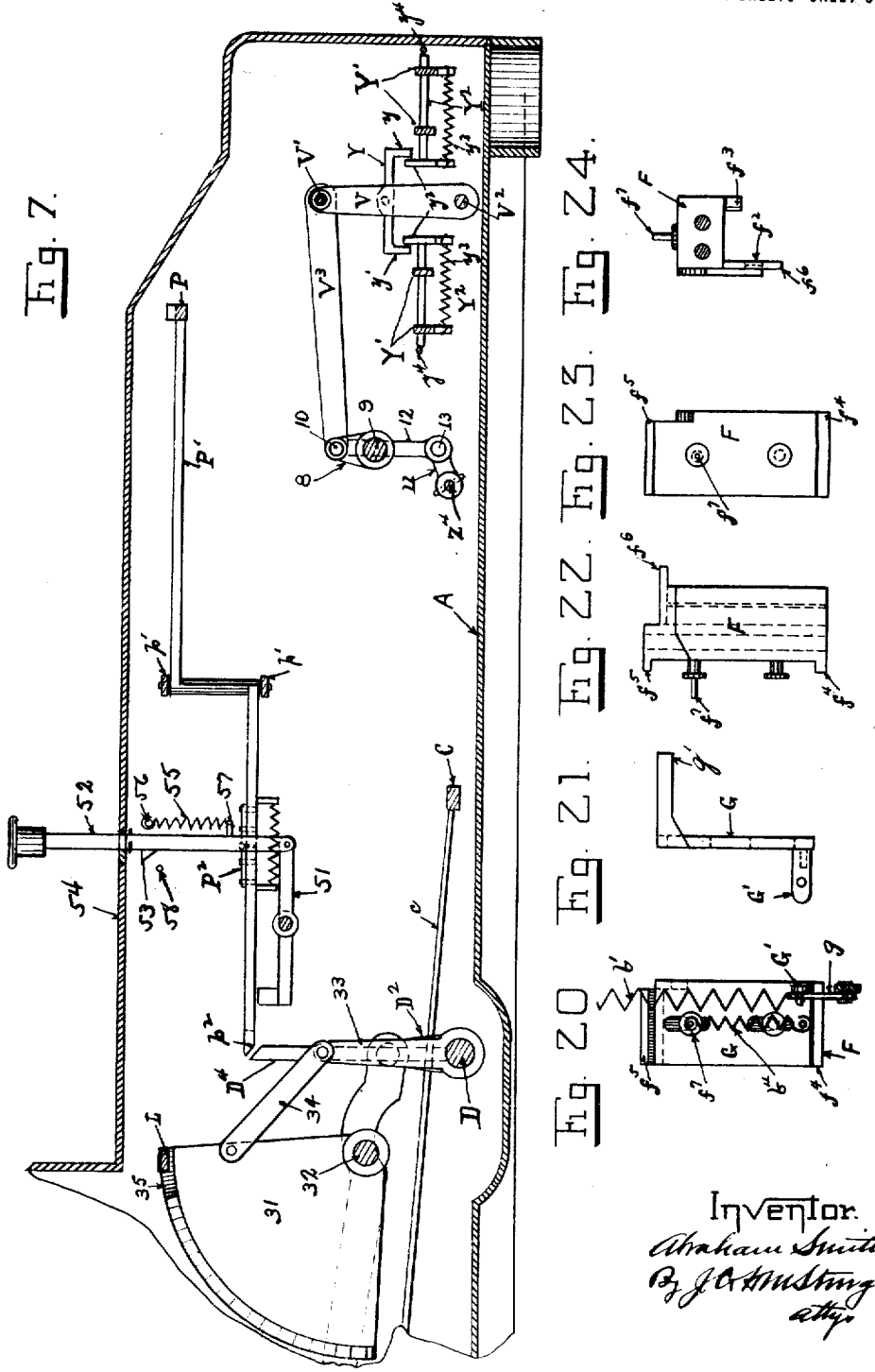

A. SMITH.
COMPUTING AND RECORDING MACHINE.
APPLICATION FILED MAY 17, 1920.
1,426,419.
Patented Aug. 22, 1922.
9 SHEETS—SHEET 7.
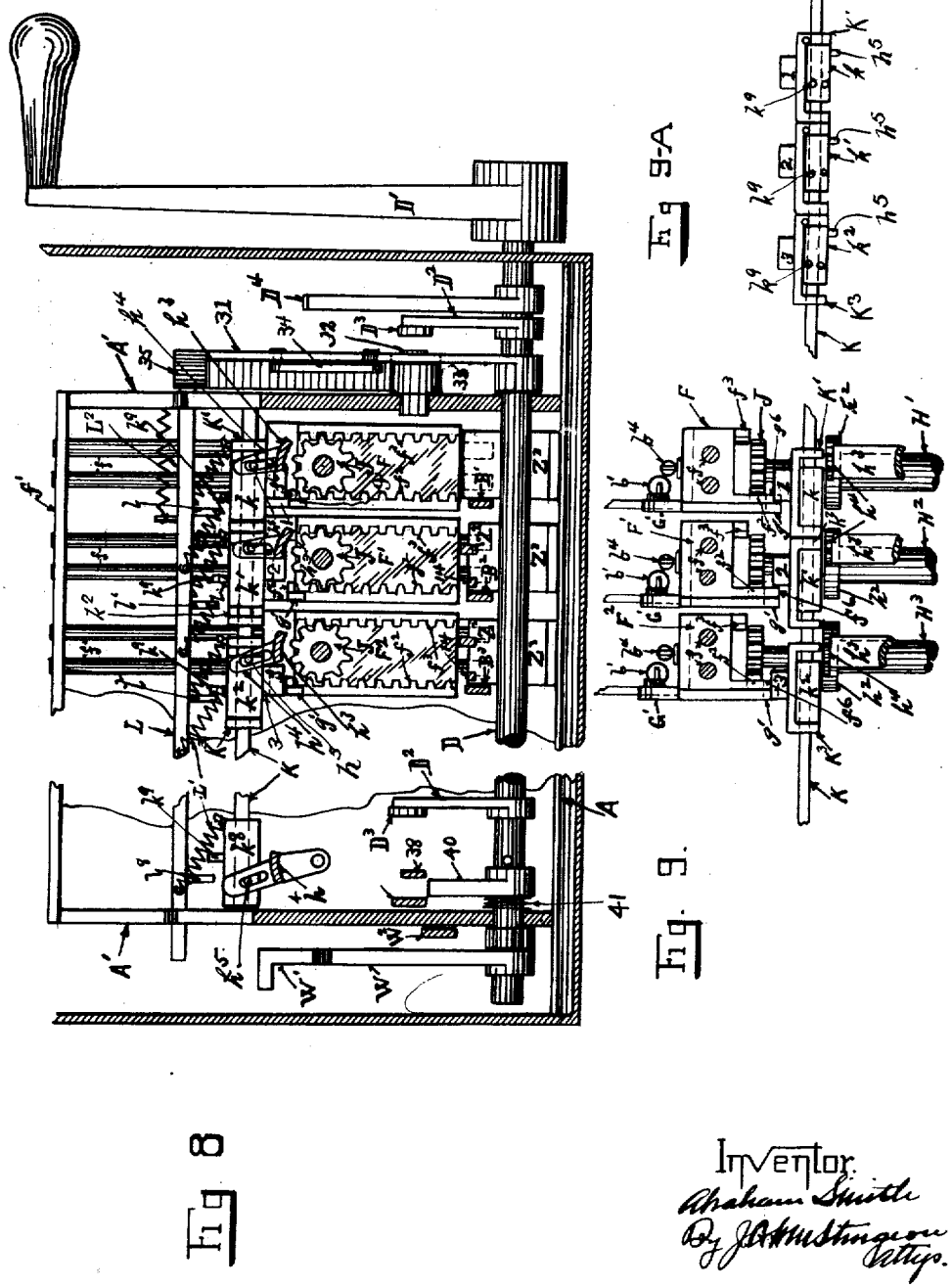
Inventor
Abraham Smith

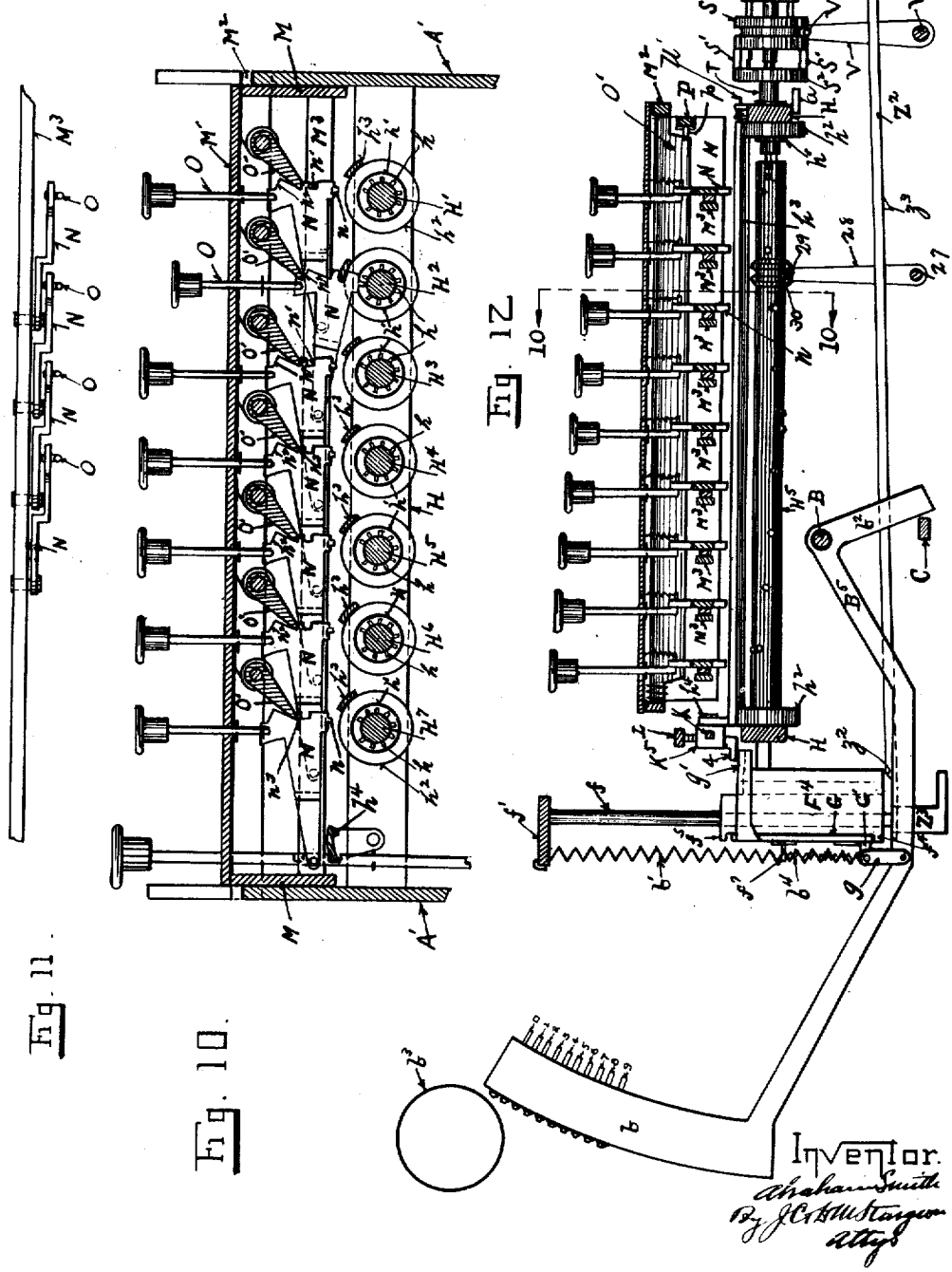

A. SMITH.
COMPUTING AND RECORDING MACHINE.
APPLICATION FILED MAY 17, 1920.
1,426,419.
Patented Aug. 22, 1922.
9 SHEETS—SHEET 9.
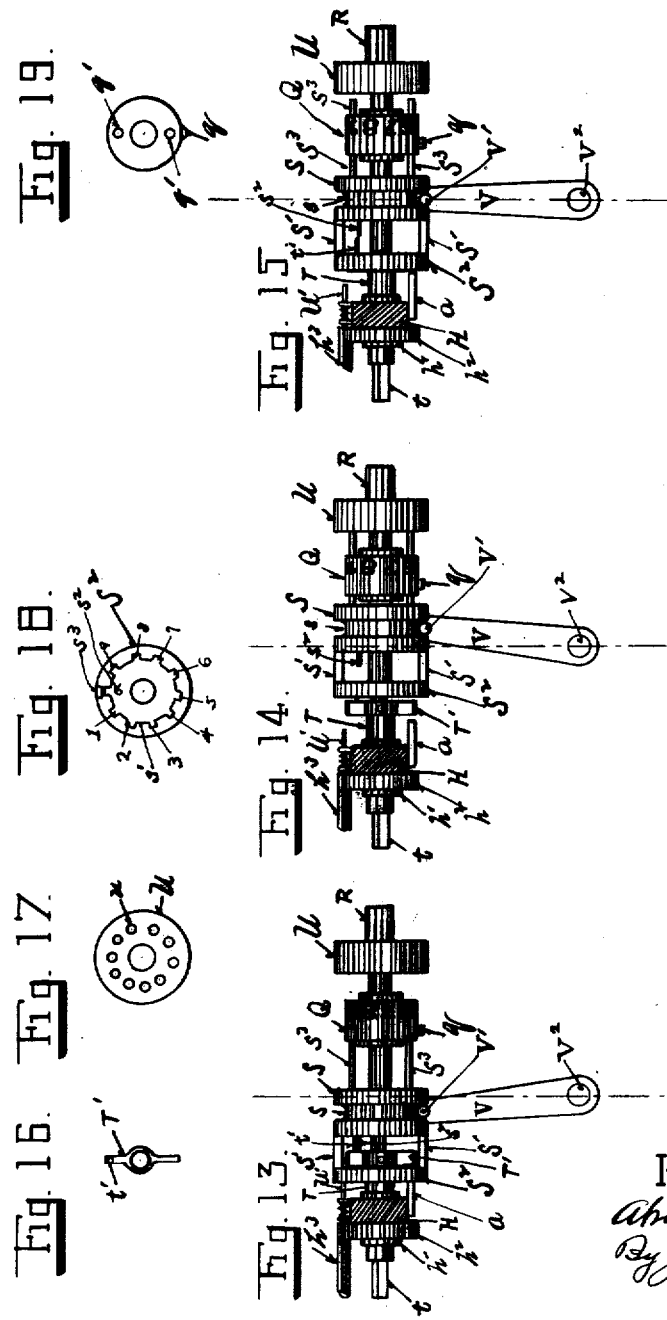

UNITED STATES PATENT OFFICE.

ABRAHAM SMITH, OF ERIE, PENNSYLVANIA.

COMPUTING AND RECORDING MACHINE.

1,426,419.　　　　　Specification of Letters Patent.　Patented Aug. 22, 1922.

Application filed May 17, 1920. Serial No. 381,875.

*To all whom it may concern:*

Be it known that I, ABRAHAM SMITH, a citizen of the United States, residing at Erie, in the county of Erie and State of Pennsylvania, have invented certain new and useful Improvements in Computing and Recording Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to computing machines which are adapted to add and subtract and record the items added or subtracted, together with the totals and remainders, and either retain the total and remainder in the accumulators, or leave them at zero.

One object of my invention is to provide a computing machine with two driving racks for each numerical order, and with a rotary detent member for each order, which are geared at will to either rack, so that it will be rotated in either direction by the rack; said gear wheel being adapted to engage both racks during the shifting from one rack to the other, so that the machine will be locked until the gear wheel is completely shifted, so that in the operation of the machine the gear wheel is never disengaged, or disenmeshed from one or the other rack.

Another object of my invention is to provide a single accumulator for each numerical order which is coupled to the rotary detent member, and which will be operated from the same point of engagement for either addition or subtraction, and which will be interlocked during disengagement.

Another object of my invention is to construct a computing machine in which subtraction, is effected by reversing the movement of the accumulator without reversing the movement of the printing mechanism.

Another object of my invention is to provide in such a machine, a transfer or carrying-over mechanism which is actuated directly by the accumulator wheels, and the operation of which is identical in either addition or subtraction.

In carrying out these objects of invention, I have constructed a computing machine in which the type carriers and accumulators are controlled by rack and gear driven rotary members, and depressible key-stops, in which the operation of direct subtraction is affected by shifting the gears without changing the position of the accumulator or the type carriers, the mechanism being so constructed that the gear wheels do not become disengaged or disenmeshed from the racks, but during the shift over-lap a pair of racks, so that the racks and gears are locked until the shift is completed.

I will set forth in a general way the plan of my invention, viz:—

Printing mechanism.

The printing mechanism consists of a series of type levers pivoted in the frame of the machine. On each of said levers there is a segmental type carrier, which has type mounted thereon in the usual manner. There are individual springs to raise said type-levers upwardly, and main spring mechanism adapted to engage said type-levers and force them downward against the action of said individual springs.

Actuating mechanism.

The actuating mechanism of my machine is a rock-shaft transversely mounted in the machine, and provided with a crank or other means for operating it. The initial movement of said rock-shaft to the right removes the tension of the main-spring mechanism from the type-levers and permits them to be raised by their individual springs, and the return reverse movement of said rock-shaft releases the tension of the main-spring so that it can force said type-levers to return to their normal position against the action of their individual springs.

Controlling or selective mechanism.

The mechanism of my invention by means of which the upward movement of the type-levers is limited at certain elevations so that the desired type carried by the several type-levers will stop at the printing line at the will of the operator, consists of gear-racks which are caused to move vertically by the individual springs of the type levers, pinion gears intermeshing therewith to rotate members which carry detents, and key-board mechanism adapted to be engaged by the detents on said rotary members when the keys are depressed, so that when the actuating mechanism is operated the individual springs of the type-levers raise their respective racks and cause the detent-bearing members to rotate until a detent thereon engages and is stopped by the mechanism of a depressed key, which thereby limits the upward movement of its respective type-carrier at the point where the type, corresponding to the key depressed will be at the printing line on the platen roller.

Key-board mechanism.

The key-board mechanism including the keys and individual key-locking mechanism is assembled in a removable frame, which can be bodily placed in the machine and removed therefrom without disturbing the rest of the machine or disassembling of the key-board. The keys are arranged in columns and are numbered from 1 to 9, in the well known order. The key-board mechanism is provided with means whereby any depressed key is retained in its depressed position from which it is released by depressing a second key in the same column, or by the operation of the actuating mechanism.

Accumulating means.

Mounted in the machine is a series of accumulating mechanisms, which are actuated by the rotary members and are adapted to record the respective results of the operations of addition or subtraction. The accumulating mechanism also, through the agency of the rotary members, actuates and controls the printing mechanism to record the results of the operations of additions or subtractions, when desired.

Transfer or carrying-over mechanism.

I provide a series of bell-crank levers, one arm of each lever being adapted to be engaged by a cam on each of the accumulating mechanisms, each of said levers having pivoted to the other arm thereof a horizontally movable bar which extends rearwardly in the machine where it controls the rack-bar mechanism of the next higher order, so that when the accumulator of the lower order has made one revolution the said horizontally movable bar is moved to permit the rack of the next higher order to drop sufficiently to cause the rotary member geared thereto to turn its associated accumulator one unit.

These and other features of my invention are hereinafter more fully explained and pointed out and are illustrated in the accompanying drawings in which:

Figure 2, is a sectional elevation on the line 2—2 in Fig. 1.

Figure 1:
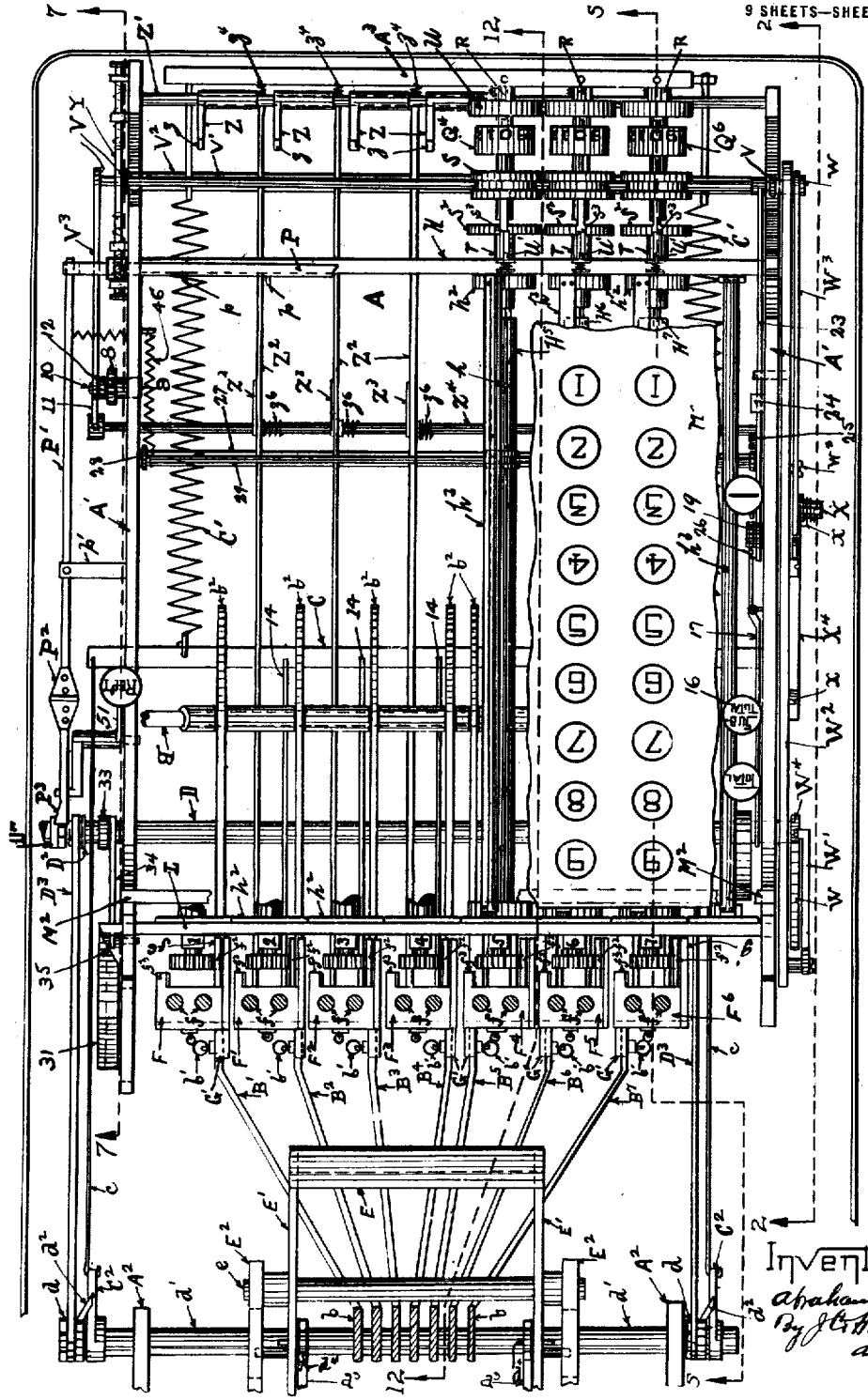
Figure 1, is a plan view of a computing machine embodying my invention with the paper carriage and other portions of the machine removed.

Figure 2-A, is an elevation of the inner side of the side-frame plate A' shown in Fig. 2.

Figure 2-B, is a side view of the levers X' and x shown in Fig. 2, removed from the machine.

Fig. 2-C, is a plan view of the same.

Figure 3, is a plan view of Fig. 2 with the cover removed.

Figure 4, is an enlarged plan view of a fragment of Fig. 1.

Figure 5, is a section on the line 5—5 in Figs. 1 and 4.

Figure 5-A, is a side view of the dog $z^3$ shown in Fig. 5.

Figure 5-B, is a plan view of the same.

Figure 6, is an enlarged sectional view of the rear portion of the machine on the line 5—5 in Figs. 1 and 4.

Figure 6-A, is a detail section of the hammer mechanism on the line 12 in Fig. 1.

Figure 7, is a sectional elevation on the line 7—7 in Fig. 1.

Figure 8, is a transverse section on the line 8—8 in Fig. 6.

Figure 9, is a sectional plan of a fragment of Fig. 8.

Figure 9-A, is a fragmentary plan of the slide mechanism shown in Fig. 9.

Figure 10, is an enlarged transverse section of the key-board mechanism on the line 10—10 in Fig. 12.

Figure 11, is a plan view of a fragment of the same.

Figure 12, is an enlarged longitudinal section on the line 12—12 in Fig. 1.

Figure 13, is an elevation of the accumulating mechanism of my invention in the position thereof when printing totals and remainders.

Figure 14, is a like view of the same while disengaged prior to adding.

Figure 15, is a like view of the same in its adding or subtracting engagement.

Figures 16, 17, 18 and 19 are elevations of details of the accumulating mechanism.

Figure 20, is a rear elevation of one of the racks F and the slidable plate G thereon.

Figure 21, is a side elevation of the plate G shown in Fig. 20.

Figure 22, is a side elevation of one of the racks F with the plate G removed therefrom.

Figure 23, is a rear elevation of the same.

Figure 24, is a plan view of the same.

Figure 25, is a side elevation of one of the detent shafts H', etc., with the diameter thereof enlarged, and a portion of the rear end thereof broken away.

Figure 26, is a view of the right hand end thereof.

In these drawings A indicates the base-plate (see Fig. 7) and A' A' indicates side-frame plates which are secured upon the base plate A.

Printing mechanism.

Upon a transverse shaft B, secured and supported by the side plate A', are mounted a series of levers B', B², B³, B⁴, B⁵, B⁶ and B⁷, each of which carries on its free end segmental type carriers $b$, said levers being provided with individual retracting springs $b'$ adapted to raise said levers B', etc. when the same are released, as hereinafter described. The levers B', etc., are provided with means for moving and maintaining said levers in their normal downward position, as shown by full lines in Figs. 6 and 12, consisting preferably of arms $b^2$, which are engaged by a laterally movable cross-bar C; and I provide main-springs C' or other form of spring mechanism, which are adapted to place sufficient tension on the cross-bar C to force the same against the arms $b^2$ with sufficient force to overcome the tension of the individual springs $b'$ and force all the type levers B', etc., to their lowermost position in which they are normally retained by the cross-bar C when the machine is not operated.

Actuating mechanism.

Mounted in the side-plates A' A' is a transverse rock-shaft D, (see Figs. 1, 2, 3, 6 and 8) which is provided with an operating crank D'; secured on said rock-shaft D are cranks D² from the free ends of which link bars D³ extend to short levers $d$ which are rotatably mounted on the shaft $d'$, supported in upright supports A² A² secured on the base of the machine; said levers $d$ being provided with arms $d^2$ which overlap levers C², also mounted on the shaft $d'$, beside the levers $d$; and from the free ends of the levers C², rods $c$ extend forwardly and are secured to the transverse bar C so that when the rock-shaft D is rotated a quarter turn toward the right, the levers D², through the link bars D³, and levers $d$ and C², on the shaft $d'$ and rods $c$, move the transverse bar C rearwardly against the action of the main-springs C', which permits the individual springs $b'$ to raise the desired type levers B', etc., upwardly as determined by the depressed keys, as hereinafter described; and when the operating crank D' is released, the main springs C cause a reverse movement of the above described mechanism.

The type hammer consists of a bar E (see Fig. 1) supported upon swinging levers E', E' which are pivoted between upright supports E² secured upon the base of the machine, upon a pivot shaft $e$, said levers E' being provided with retracting springs $e'$ (see Fig. 6) to furnish the necessary motive force for the hammer strokes. To retain the hammer in its striking position as shown in Fig. 6, a spring actuated latch-hook E³ is pivoted to one of the supports E², which engages one of the levers E'. For releasing the latch-hook E³ from engagement with the lever E', I provide the lever $d$ with an arm $d^3$, which, when the lever $d$ swings forward during the above described operation of the actuating mechanism, is adapted to strike the latch-hook mechanism E² and cause the same to release the lever E' and leave it free to the action of the spring $e'$. On the return of the actuating mechanism to its normal position the lever $d^4$ secured on the shaft $d'$, engages the hammer-lever E' and pushes it backward until the latch-hook E² again engages it.

It is obvious from an inspection of Fig. 6, that the arm $d^3$ of the lever $d$ will not engage the latch-hook E² until the lever $d$ has about completed its forward movement, so that the type-carriers $b$ will have raised the desired types to the printing line in front of the platen-roller $b^3$ before the hammer E is released.

Controlling or selective mechanism.

This mechanism consists of the vertically movable rack-gears F, F', F², F³, F⁴, F⁵ and F⁶ (see Figs. 6, 8 and 9 which are slidably mounted on slides $f$ secured in the base A of the machine, and the cross-bar $f'$ supported on the frame plates A', to which cross bar the upper ends of the individual springs $b'$ are also secured.

These rack-gears F, etc., have each two rows of teeth $f^2$ and $f^3$ which are spaced apart, as shown in Fig. 8, but on different vertical planes, as shown in Figs. 9 and 24. The racks F, etc., are also provided with flanges $f^4$ and $f^5$ at the lower and upper ends of their rear sides, and slidably secured on the rear sides of the racks F, etc., are plates G which are shorter than the space between the flanges $f^4$ and $f^5$ so as to permit sufficient relative movement of said racks and plates for the purpose hereinafter described.

The plates G are provided with ears G' (see Figs. 6 and 21) which are connected to the type levers by means of links $g$, so that the levers B, B', etc., plates G, and racks F, etc., will move in unison. The individual springs $b'$ are connected to the ears G' of the plates G, and a short spring $b^4$ extends from a post $f^7$ (see Figs 20, 22 and 24) extending through a slot in the plates G and secured in the racks F, etc., and acts to yieldingly maintain the flanges $f^4$ on the racks F, etc., against the lower ends of the plates G. These plates G control the printing of the zeros, and also provide for the carrying-over from a lower order to the next higher order.

Slidably and rotatably mounted in transverse bars H H are rotatable members consisting preferably of shafts H', H², H³, H⁴, H⁵, H⁶ and H⁷, each of which is provided with a series of nine radial detents or posts h, longitudinally arranged around its periphery. Each shaft H', etc., has secured thereon a gear pinion J (see Figs. 8 and 9) which intermesh normally with the rack-teeth f² on the racks F, etc., so that when any of said racks move upward the shafts geared thereto are caused to rotate.

Rack-locking mechanism.

In order to prevent the movement of the racks F, etc., and the plates G thereon, so that zeros will not be printed to the left of numerals, I provide on the racks F, etc., arms f⁶, and on the plate G, arms g' (see Figs. 9, 21, 22 and 24). Upon a transverse bar K in the machine frame, are slidably mounted locking devices consisting of elongated U-shaped slides K', K², K³, etc., (see Figs. 8, 9 and 9-A) within which, upon the bar K are slidable blocks k, k', k², etc., of less length than the space between the arms of the U-shaped slides.

Above the bar K is a slidable spring pressed bar L (see Figs. 6, 7 and 8) to which springs L' are attached, which extend and are attached to the slides K', K², etc., (see Figs. 8, 9 and 9-A); and to the slides k, k', etc., so that when the bar L is moved to the left said springs L' draw the slides K', etc., and the slides k, etc., toward the left.

In order to cause the slides K', etc., and k, etc., to return to their normal position, the slidable bar L is provided with arms l, l' etc., which on their movement toward the right engage projecting studs k³ on the slides k, k', etc., and force all of said slides to the right or their normal positions. The slides k, k', k², k³, k⁴ and k⁵ have a rearwardly projecting extension 1, 2, 3, 4, 5, 6 and 7 (see Figs. 1, 6, 9, 9-A and 12) which is broad enough to overlap the arms f⁶ and g' on the racks F and plates G, and in their normal position, calling the arms f⁶ and g' two spaces, they are one space toward the right from the rack arm f⁶, so that each of said slides k, etc., must move three spaces to overlap both arms f⁶ and g'.

If no keys are depressed, and the operating lever D is operated, the sliding bar L will be moved toward the left and will, through the springs L' draw the outer U-shaped slides K', K², K³, etc., to the left in unison until the last slide k⁷ contacts with the side plate of the machine frame A', the distance of said movement being two spaces.

The inner slides k, k, k², etc., which carry the arms or projections 1, 2, 3, etc., move with the outer U-shaped slides until the movement of said outer slides is stopped, when the inner slides continue to move toward the left one more space until they contact with the left hand arms of the U-shaped slides; said inner slides thus moving a distance of three spaces, which carries their arm 1, 2, 3, etc., over the rack-arms f⁶ and the plate-arms g' so that neither racks nor plates are permitted to move upward, being by said arms 1, 2, 3, etc., securely locked in their most downward position.

If however, a key is depressed, as shown in Fig. 10, the inner slide k' will cause the key-locking bar h³ to swing into the notch n' in the key-lever N (see Fig. 10) and thereby stop the left hand movement of the inner slide k' at the end of one space, as shown in Fig. 8; and also the like movement of the U-shaped slides K' and K² with the arm l on the inner slide k having moved two spaces and overlapping the arm f⁶ on the rack F, and the arm 2 on the inner slide k' having now moved but one space does not overlap the arm f⁶ on the rack F', while the U-shaped slides K³, K⁴, etc., move two spaces and their inner slides k², k³, etc., are permitted to move toward the left three spaces so that the arms 3, 4, 5, etc., on the inner slides k², k³, etc., overlap both arms f⁶ and g' on the racks and slide-plates so that said racks and plates are thereby prevented from moving upward during the printing of the desired amount by the first and second order type carriers.

The operation of the mechanism above described is further described under the head of "Adding operation" commencing on page 9.

All of the slides k, k', etc., move toward the left until stopped by the arms l, l', etc., on the sliding bar L unless a key is depressed, or by the operation of the total printing mechanism hereinafter described.

Key-locking mechanism.

Around the bearings of the rotary shafts H', H², etc., in the cross-bars H H are hubs h' upon which are mounted rotatable rings h², h², upon which are secured bars h³, one end of which is bent upwardly to form a lever h⁴ which is provided with a slot, through which a pin h⁵ passes, by means of which said levers h⁴ are operatively connected to the inner slides k, k', k², etc., so that when said slides move to the left or right on their supporting bar K the key-locking bars are caused to oscillate around the axis of the shafts H', H²; etc. so as to engage or release the key-mechanism as hereinafter described.

Key-board mechanism.

In constructing the key-board mechanism of my machine I provide a frame composed of the side-bars M M (see Figs. 10, 11 and 12) upon which is placed a top-plate M' through which the key-stems O operate. I also provide transverse bars M² M² which enter notches cut in the upper edge of the side frame plates A', A', whereby the keyboard frame is supported in the machine. Secured between and supported by the side-plates M M of the key-board frame are a series of transverse bars M³, to which are pivoted series of key-actuated levers N which overlap each other as shown in Fig. 11. To these levers N key-stems O are pivoted, which extend upwardly through the plate M'. The levers N are provided with points $n$ which are adapted to engage the detents $h$ on the shafts H', H², etc., when the keys are depressed and the shafts are rotated as hereinbefore described, for the purpose of stopping said rotation at the desired point.

The key-levers N are also provided with notches $n'$ into which the locking-bars $h^3$ enter when a key is depressed, as shown in Fig. 10, and the operating lever D' is operated the locking-bars to the left of the depressed key moving upward so as to come to rest under the key-levers N to the right and left of the depressed key when the actuating mechanism is operated, thus preventing the depressing of any keys after the initial movement of said actuating mechanism.

For retaining the keys in a depressed position prior to the operation of the actuating mechanism I pivot in the key-board frame, spring-pressed bars O' which are parallel with each column of keys from the lowest order to the highest, said bars O' being adapted to engage the shoulders $n^2$ on the key-levers N when the keys are depressed, so as to retain the keys in a depressed position until released at the end of the operation of the actuating mechanism, as hereinafter explained.

These spring-pressed bars O' also normally engage notches $n^3$ on the key-levers N when they return to their normal raised position. For disengaging the bars O' from the depressed key-levers N to permit the keys to return to their normal position, I provide a transversely slidable spring-pressed bar P (see Fig. 1) which is provided with studs $p$ adapted to engage each bar O' and force them out of engagement with the shoulders $n^2$ on the key-levers, when the bar P is moved to the right. For operating the bar P I provide a lever P' (see Figs. 1 and 7) which is pivoted upon a bracket $p'$ on the side frame A', one arm of said lever being pivoted to said bar P. The opposite arm of said lever is provided with a hinged joint P², and the extremity of the hinged arm is provided with an inclined surface $p^2$ which is engaged by a lever D⁴ on the actuating shaft D for the purpose of forcing the hinged portion of the lever P' upward so that it will pass under said lever during its forward movement. The hinged arm of the lever P' is also provided with a cam-surface P³ (see Fig. 1) which the lever D⁴ (see Fig. 7) engages on the last portion of the reverse movement of the actuating shaft D, and causes the lever P' to move the bar P to the right, thus bringing the studs $p$ against the locking-bars O' and off of the shoulder $n^2$ on the key-levers N of the depressed keys, and allowing the springs N' (see Fig. 12) to return the keys and their levers N to their normal position, as determined by the engagement of the bars O' with the notches $n^3$ on the key-levers N.

It will be observed from Figs. 10 and 12, that the above described key-board mechanism is all mounted and contained in its own frame, which can be placed in position in the machine frame, and that when so placed it is non-shiftably retained by means of the ends of the transverse bars M³ of the key-board frame resting in suitable notches in the upper edge of the side frame plates A' of the machine, as shown by Figs. 1, 2, 6 and 10.

*The accumulating mechanism.*

The accumulating mechanism of my machine consists of wheels Q, Q', Q², etc., which are journalled upon a stud-shaft R non-rotatably secured in the end frame plate A³ (see Figs. 1, 4 and 5). Each of said wheels have around their peripheries, numerals (0, 1, 2, 3, 4, 5, 6, 7, 8, 9). Each of the wheels Q have a projecting, double-faced cam-surface $q$ (see Figs. 13, 14, 15 and 19) on its periphery, opposite the zeros, for the purpose of operating the transfer mechanism hereinafter described. The wheels Q are also provided with holes $q'$ (see Fig. 19). Slidably and rotatably mounted on the non-rotatable stud-shafts R to the rear of the wheels Q are controller wheels S, which have an annular slot $s$ around the peripheries thereof. The wheels S have arms S' extending to rings S², which rings have ten internal cogs $s'$ (see Fig. 18). The wheels S, arms S' and rings S² being preferably of integral construction.

Rotatably mounted in the transverse bar H of the machine frame, are short shafts T, which are in axial alignment with the shafts H', H², etc., and the stud-shafts R, which have square ends $t$ which enter the ends of the shafts H', H², etc., and have secured on their opposite ends cross-arms T' (see Figs. 13, 14 and 16) over which the ring S² is adapted to slide, the ends of the cross arms T' entering the internal cogs $s$ in the ring S². The wheels S and cross-arms T' are also provided with pins $s^2$ and $t'$ which are adapted to engage each other as hereinafter described.

The wheels S are provided with stud-rods S³ which project therefrom through the holes $q'$ in the accumulator wheels and enter holes $u$ in the discs U (see Fig. 17) so as to prevent the rotation of the wheels Q and S, and the ring $S^2$ as hereinafter described.

Secured on the transverse bar H is an arm $a$ which is adapted to enter the internal cogs $s$ in the ring $S^2$, as shown in Fig. 13, so that the ring $S^2$ and wheel S will not rotate when in that position. There is also secured on the transverse bar H a spring-pressed bolt U', which is adapted to be pressed to the left by the ring $S^2$ so as to stop the locking bars $h^3$ the same as a depressed key does, except when the accumulator wheels Q show zeros, in which case said spring-pressed bolts enter the notches $s^2$ in the ring $S^2$ so that, in that case the locking bars $h^3$ are not engaged by said spring-pressed bolts U'.

In operation the accumulator mechanism is in the position shown in Fig. 15, being held in such position by the shifting levers V, at each side of the machine, which have a transverse connecting rod V' in their upper ends, which rests in the annular slots $s$ in the wheels S. Said levers V are operated by the actuating mechanism as hereinafter described. At the initial movement of the actuating mechanism the levers V shift the wheels S and rings $S^2$ to the position shown in the Fig. 14, and when the printing mechanism operates, the shafts H', $H^2$, etc., cause the shafts T and cross-arms T' to revolve until the shafts H', $H^2$, etc., are stopped by their detents engaging the depressed key-mechanism, and at the end of the forward movement of the actuating mechanism the levers V return the wheels S and rings $S^2$ to the position shown in Fig. 15, with the arms $T^A$ engaging the internal cogs $s$ in the rings $S^2$ so that when the shafts H', $H^2$, etc., return to their normal positions they cause the rings $S^2$, wheels S and accumulators Q, Q', etc., to rotate a relative number of points. During the time the mechanism is in the position shown in Fig. 14, the stud-rods $s^3$ have entered holes $u$ in the discs U whereby the accumulator is locked against rotation while the cross-arms T' are being rotated to the required position to register the desired number of counts on the accumulator.

*Accumulator shifting mechanism.*

The levers V are secured upon a rock-shaft $V^2$ mounted in the side frame-plates A' so that they will oscillate in unison, and the cross-rod V' will shift all of the wheels S simultaneously.

To cause the levers V to oscillate, I provide a cam-plate W on the actuating shaft D which actuates a bell-crank lever W', which is pivoted on one of the side plates A'. The other arm of the lever W' has pivoted thereto a bar $W^2$ which extends forwardly and is supported on a lever V by means of a pin $w$ which passes through a slotted opening in the bar $W^2$, so that said bar $W^2$ can slide on the pin $w$ without actuating the levers V.

Upon the bar $W^2$ is another bar $W^3$, one end of which is pivoted on the pin $w$, and the rear end of which is provided with a slotted opening $w'$, through which a screw $w^2$ passes, which is secured in the bar $W^2$ so that relative movement between the bar $W^2$ and bar $W^3$ is provided for.

Upon a pivot pin X rotatably mounted in the side frame plate A' under the bar $W^2$ is secured a lever X', and besides said lever there is mounted on the pivot pin X a lever $X^4$, which has a shoulder $x$ which overlaps the lever X' (see Figs. 2, 2-B, and 2-C). The lever $X^4$ is adapted to be engaged by the cam-plate W at the end of the forward movement of said cam-plate, to cause the lever $X^4$ to swing downwardly.

Inside of the frame-plate A there is secured on the pivot-pin X an upright lever $X^2$ which is provided with a spring $x'$ to yieldingly maintain the levers X' and $X^2$ in their normal position, as shown in Figs. 2, 2-B and 2-C. Pivoted on the lever $X^4$ is an upright post $X^3$ (see Fig. 2) which is provided with a spring $x^2$ to maintain said post in contact with a stud-screw $x^3$ secured in the bar $W^3$.

The post $X^3$ is provided with a shoulder $x^4$ which is adapted to pass under the end of slide-bar W when said slide-bar is carried forward by the bar $W^2$, when said bar $W^2$ is moved forward by the bell-crank lever W'. The post $X^3$ is supported in its upright position, against the end of the bar $W^3$ by means of the stud-screw $x^3$ being retained in engagement therewith by the spring $x^2$ on the lever $X^4$.

When the bar $W^2$ is moved by the bell-crank lever, as above described, it forces the post $X^3$ against the end of the slide bar $W^3$, and thereby moves the slide bar $W^3$ in unison with the bar $W^2$ until the cam plate W engages the lever $X^4$ which draws the post $X^3$ downward until the end of the slide bar $W^3$ will be forced to pass over the shoulder $x^4$ on the post $X^3$ by the action of the centralizing mechanism hereinafter described. The said simultaneous forward movement of the bars $W^2$ and $W^3$ causing the levers V to shift the accumulator mechanism from the position thereof shown in Fig. 15, to that shown in Fig. 14, and the relative rearward movement of the bar $W^3$ on the bar $W^2$ allowing said accumulator mechanism to return to the position shown in Fig. 15, while the reverse movement of the cam-plate W allows the bar $W^2$ to be returned to its normal position by the spring $w^3$, as shown in Fig. 2.

*Centralizing mechanism.*

In order to yieldingly maintain the levers V and the wheels S in their centralized or normal position, as shown in Figs. 2 and 14, I pivot on the lever V at one side of the machine, a cross-arm Y having down-turned ends or ears $y$ and $y'$, and mounted in brackets Y' on the side frame A' are slides $Y^2$ $Y^2$ provided with up-turned ends $y^2$, which are drawn against the down-turned ears $y$ $y'$, by means of springs $y^3$; and to limit the horizontal movement of the slides $Y^2$, I provide stops $Y^4$, on the side frame-plate A' so that when the lever V is swung to the right, as shown in Fig. 14, the ear $y'$ on the cross-arm Y moves in the slide $Y^2$ on the left of the lever V toward the right, and when the lever V is released, said slide is drawn to the left by its spring until the slide engages its stop $y^4$, and when the lever V is moved to the position shown in Fig. 13, the slide $Y^2$ to the right of said lever draws the lever V toward the right until said slide engages its stop $y^4$, so that when both slides are engaging their stops the lever V will remain in its central position, as shown in Figs. 7 and 15.

*Transfer or carrying-over mechanism.*

In order to provide for a transfer from a lower order to a higher order, I mount a series of bell-crank lever mechanisms Z (see Figs. 1, 5 and 12) upon a transverse supporting shaft Z' secured in the side-frame A' of the machine; one arm $z$ of said bell-crank lever being engaged by the cams $q$ on the accumulator wheels Q of a lower order from which a transfer is to be made.

Pivoted to the opposite arm $z'$ of the bell-crank levers are bars $Z^2$ (see Figs. 1, 5, 6, 8 and 12) which extend rearwardly and rest on the foot-blocks $Z^3$ under each of the racks F, F', etc. Each of these bars is provided with an inclined or wedge-shaped shoulder $z^2$, which, when the bar $Z^2$ is moved longitudinally by the bell-crank levers Z, are moved under the racks or withdrawn from under the same, thus causing them to move upwardly and downwardly one space or unit. Thus, when the cam $q$ on the accumulator wheel Q at the right of the machine engages the bell-crank lever Z at the right, the bar $Z^2$ is operated to withdraw its wedge shoulder $z^2$ from under the rack F' allowing it to drop down an extra space, thus causing the shaft $H^2$ to revolve one point and turn the accumulator wheel Q' of the next higher order one unit.

The bars $Z^2$ are provided with ratchet shoulders $z^3$ which, when the bars $Z^2$ are moved by the bell-crank levers Z, are engaged by spring-pressed ratchet dogs $Z^3$ which are adapted to retain said bars in the position to which they are moved by the bell-crank levers, until said dogs are operated to release them, as hereinafter described, when said bars $Z^2$ are forced backwardly by the springs $z^4$ so that the wedge shoulders $z^2$ will again enter under the rack and lift them again to their normal positions. The operation of the other bell-crank levers is the same as above described, the cams $q$ on the accumulator of each succeeding higher order successively operating its relative bell-crank lever at the end of its revolution.

In Figs. 5-A and 5-B I show a detailed illustration of the mechanism of the spring-pressed dog $Z^3$, wherein $Z^4$ is a transverse shaft pivoted in the side-plates A' of the machine; $Z^5$ indicates a sleeve non-rotatably secured on said shaft having an arm $z^5$ which over-laps the dog $Z^3$. A spring $z^6$ is provided to yieldingly press the dog $Z^3$ upwardly against the bar $Z^2$ and ratchet tooth $z^3$.

When the bars $Z^2$ have been operated as above described, the dogs $Z^3$ retain them until they are released by the operation of the actuating mechanism, and accumulator shifting mechanism, which includes the levers V. From the transverse rod V' in the upper ends of the levers V, a link-bar $V^2$ extends backward to a crank 8 pivoted upon a stud-screw 9 upon the side of the side-frame plate A' by means of a wrist-pin 10 and upon the transverse shaft $Z^4$ there is a crank-arm 11.

From the wrist-pin 10 a link-bar 12 extends to a pivot-pin 13 in the end of the crank-arm 11 so that when the link-bar $V^2$ moves to the right or left, the wrist-pin 10 swinging on the arc of a circle causes the link-bar 12 to operate the crank-lever 11 to rock the shaft $Z^4$ and swing the dogs $Z^3$ out of engagement with the ratchet teeth $z^3$ on the bars $Z^2$, and permit the bars $Z^2$ to be moved backward by the springs $z^4$.

Secured to the cross-bar C (see Figs. 1 and 12) are a series of slide-bars 14 which are provided with wedge-shaped shoulders 15 (see Fig. 6) adjacent to the rear ends thereof, which shoulders are adapted to engage and enter under the racks F, F' etc., and lift said racks upward at the end of the forward movement of the actuating crank-lever D', which permits of the free movement of the transfer bars $Z^2$ and their wedge-like shoulders $z^2$ under the racks, and when the actuating crank-lever D is allowed to return to its starting point the main springs C' operating on the transverse bar C withdraw the bars 14 from under the rack F, F', etc., thus allowing them to rest on the transfer bars $Z^2$.

*Sub-total recording mechanism.*

The sub-total mechanism of my machine consists of a spring-pressed key 16 which is adapted to engage the lever X' and press the same downward, as shown by broken lines in Fig. 2-A, which causes the pivot-pin to rock and swing the lever $X^2$ rearwardly.

The downward swing of the lever X' causes the over-lapping shoulder $x$ to engage the lever X⁴ to swing the same in unison with the lever X⁴ and withdraw the upright post X³ from behind the slide-bar W². When, however, the cam-segment W nears the end of its forward movement it engages the lever X⁴ and withdraws the upright post X³ without operating the lever X'. Pivoted on the inside of the plate A' is a rock-lever 17; in one end 18 of said lever is an arm 19 which extends upward behind the lever X² and has a notch 20 cut out of its upper corner. There is a stop 21 to limit the upper movement of the arm 19 by the spring 22.

To the upper end of one of the levers V, a slide-bar 23 extends backward through a guide 24 past the lever X² and arm 19, said slide-bar 23 being provided with stud-screws 25 and 26, the stud-screw 26 engaging the rear side of the arm 19.

Mounted in the machine side frame-plate A' is a rock-shaft 27, upon which are secured levers 28, in the upper ends of which are secured a cross-rod 29 which rests between annular shoulders 30, (see Figs. 5 and 12) on the detent shafts H', H², etc., and the stud-screw 25 on the slide-bar 23 engages one of said levers 28 so that when the lever X' is pressed downward by the key 16 the lever X² engages the arm 19, which in turn engages the stud-screw 26 on the slide 23 and causes it to slide toward the rear, which causes the stud-screw 24 to engage the lever 28 and swing the transverse rod 29 to the rear thereby causing all of the detent shafts H', etc., to slide longitudinally toward the rear of the machine so that the pinion gears J will slide out of mesh with the rack-gear teeth $f^2$, and into mesh with the rack-gear teeth $f^3$ on the racks F, F', etc. This sliding of the bar 23 toward the rear causes the levers V to shift the accumulator mechanism from the central or normal position thereof shown in Fig. 15 to that shown in Fig. 13, with stop-arm $a$ (see Figs. 13, 14 and 15) projecting into the ring S² between two of the internal teeth $s$, which retains the accumulator mechanism against rotation.

The shifting of the accumulator mechanism to the position shown in Fig. 13, causes the ring S² to operate the spring-pressed bolt U', upon the supposition that a number is thereon accumulated; but if any particular accumulator stands at zero, the notch $s^2$ on the ring S will register with the spring-pressed bolt U', and said bolt U' will enter said notch and will not be operated by said ring.

The operation of the spring-pressed bolts U' stops the movement of the locking-bars $h^3$ at the end of one space, the same as a depressed key would stop them, said locking-bars $h^3$ stopping the left hand movement of the inner slides $k$, $k'$, etc., so that the racks F can be moved vertically by their individual springs $b'$, thereby causing the shaft H', etc., to rotate reversely until the stud-pin $t'$ (see Figs. 13 and 14) on the cross-arms T' engages the stud-pin $s^2$ on the ring S, and is stopped thereby; the stopping of the shafts H', etc., limits the upward movement of the type-carriers so that the types carried thereby will record the total shown by the accumulators, of the items previously listed.

The key 16 when pressed down, is held down until the actuating shaft is started, which, through the slide-bar L (see Fig. 8) causes the slide $k^3$ to operate the locking-bar $h^4$, which engages notches 30ᵃ in the sides of the stem of the key 16, said locking-bars $h^4$ being moved backward from said key-stem on the reverse movement of the actuating shaft D.

To cause the sliding-bar L to reciprocate when the shaft D is rocked, I pivot on the side frame-plate A' a segmental cam 31 by means of a pivot-post 32, and I put a crank-arm 33 on the shaft D which is connected with the cam 31 by means of a link-bar 34, so that when the shaft D is turned or rocked to the right, the cam 31 is rocked to the right, which causes the cam-surface 35 to engage the end of the bar L and move it toward the left thereby causing the slides $k$, $k'$, etc., to move toward the left for the purposes hereinbefore described.

*Total recording mechanism.*

To record the final total of the listed items, after which the accumulators will all be returned to zero, I provide a key-stem 36 which is adapted to engage the lever X' and swing it downwardly to the position thereof shown by broken lines in Fig. 2-A, in which position it must be retained by the finger of the operator until the actuating mechanism is started, when the locking-bar $h^4$ (see Fig. 8) will be swung over to engage the notch 37 in the key-stem, to hold the key-stem 36 in its depressed position.

The downward movement of the lever X' causes the lever X⁴ to move in unison therewith and withdraw the post X³ (see Fig. 2) from behind the slide W² so that the lever X² (see Fig. 2-A) acting against the arm 19 can move the slide-bar 23 and lever V toward the rear of the machine, thus shifting the accumulator mechanism to the position shown in Fig. 13.

When the key-stem 36 is depressed, the L-shaped lever-bar 38 pivoted thereto and to the side frame A' (see Fig. 2-A) is moved to the position thereof shown by broken lines in said Fig. 2-A, so that the cam-surface 39 on the side of the segmental plate 40 will engage said L-shaped lever-bar 38 and cause it to slide on the actuating shaft D against the spring 41 (see Fig. 8) so that said segmental plate 40 will be under the arm 42 of the lever 17 and the cam-surface 40ª (see Fig. 2-A) will engage said lever arm 42 and cause it to move the arm 19 downwardly so that the point on the upper end of the lever X² will enter the notch 20 cut out of the upper end of the arm 19, and permit the slide-bar 23 and levers V, and accumulator mechanism Q to be moved back to their normal engaged position, as shown in Fig. 15, by the centralizing mechanism Y, etc., shown in Fig. 7.

The movement of the slide-bar 23 toward the rear of the machine, as above described, has swung the levers 28 to the position thereof shown by broken lines in Fig. 2-A, and moved the detent shafts H', etc., to the rear, as in the sub-total operation hereinbefore described, and the latch-arm 43 has dropped down to engage the stud-pin 44 on the lever 28, thus retaining the levers 28 and detent shafts H', etc., in their rearwardly shifted position.

On the reverse movement of the actuating shaft D and segmental plate W (see Fig. 2) the spring $w^3$ moves the slide W² rearwardly, the slide W³ being held stationary by the centralizing mechanism Y, etc., shown in Fig. 7, the rearward movement of the bar W² causing the stud-pin 45 secured thereon (see Fig. 2-A) to engage an arm on the latch 43 and swing said latch upwardly to disengage the same from the stud-pin 44 on the lever 28, which permits the spring 46 (see Fig. 1) to shift the detent shafts H', etc., back to their normal position, as shown in Fig. 2.

During the reverse movement of the actuating shaft D, the main springs C' are gradually released so that the racks F', etc., are caused to return to their normal positions, thus causing the detent shafts and accumulator mechanisms operated by said shafts to return to their normal zero positions, and at the termination of the reverse movement of the shaft D the detent shafts H', etc., are returned to their normal positions, as described.

*Subtracting mechanism.*

In order that the machine will deduct an amount listed from the preceding items, I provide a bell-crank lever 47 which is pivoted on the frame plate A' by means of the pivot 48. One arm of this lever 47 engages the stud 49 on the lever 28, and the other arm is pivoted to the key-stem 50 of the subtracting key. When the key-stem 50 is depressed, the bell-crank lever 47 engaging the stud 49 swings the levers 28, which causes the detent shafts H', etc., to slide rearwardly, shifting the pinion-gears J out of mesh with the gear rack $f^2$ and into mesh with the gear rack $f^3$, the square stud on the accumulator shaft T which extends into the square opening $h^5$ in the end of the shafts H', etc., permitting of said edgewise movement of said shafts.

When the key-stem 50 is depressed as above described, the accumulator mechanism is not shifted. Now, when the actuating shaft is operated to record the amount to be deducted, the racks F' etc., cause the detent shafts to rotate toward the left, or in reverse direction to the adding or normal rotation of said detent shafts, which reversing of the detent shafts causes the accumulator mechanism to rotate backward the required number of units.

During this subtracting operation the latch 43 operates and is released exactly as in the sub-total and total operations.

*Repeating mechanism.*

In order to enable the machine to repeat the operation of printing and adding the same amount at each successive operation of the actuating mechanism without further manipulation of the finger-keys, I provide a key-operated lever 51, which is provided with a key-stem 52 which has a shoulder 53 adapted to engage a stud 58 secured on the side of the casing 54 of the machine, when the key-stem 52 is depressed. A spring 55 is also provided, one end of which is secured to a stud 56 on the casing of the machine, and the other end of which is secured to a post 57 on the key-stem, so that said spring not only lifts the key-stem upwardly, but throws the same toward the left so that the shoulder 53 will engage the stud 58 and retain the key-stem 52 in its depressed position.

When the lever 51 is operated, it raises the hinged end of the lever P' so that it will not be engaged by the cam-arm D⁴, and the said lever P' will not be operated to actuate the slide-bar P to disengage the dog-bars O' from the key-levers N, so that when the required keys are depressed to record and add a certain amount, to repeat said amount the key-actuated lever 51 is depressed, and the actuating lever D' is operated the number of times it is desired to repeat the recording and adding of said given number. On the final operation of the lever D the locking mechanism of said key-actuated lever 51 is released so that the hinged end of the lever P' will engage the cam-arm D⁴, to be operated thereby to cause the disengagement of the locking-bars O' from the depressed key-levers N.

*Adding operation.*

When it is desired to add 50 and 60, the 5 key in the second order row from the right is depressed, which causes the key-lever N (see Fig. 10) connected with said key, to move to the position shown in said figure. The actuating arm D' is then moved downward. At the commencement of the movement of the handle D', the arm D² on the actuating shaft D causes the crank-arm $d$ to swing the arm C² from the dead center position shown in Fig. 6, downward. At the commencement of the swing of the arm C² downward, there is little if any longitudinal movement imparted to the rods $c$ and cross-bar C, so that practically there is an appreciable degree of lost motion during the first portion of the forward swing of the actuating arm D', as shown in Fig. 6, during which time the segmental plate W (see Fig. 2) rotates to the right and the upper end of the bell-crank lever W' is actuated by the cam-surface W⁴ to cause the slide-bars W² and W³ to move toward the right as hereinbefore described for the purpose of disengaging the accumulator mechanism Q, as hereinbefore described.

The continued forward movement of the actuating lever D' draws the cross-bar C away from the arm $b^2$ of the type-levers B', B², etc., which permits them to be swung upwardly on their pivot B by the individual springs $b'$ with the rack F', the rack-teeth $f^2$ causing the detent-shaft H² to rotate until the 5 detent thereon (see Figs. 25 and 26) engages the depressed key-lever N and is stopped thereby, which limits the upward movement of the type-lever, with the 5 type at the printing lines.

During the above described movement of parts, the cam-plate 31 moves the slide-bar toward the left, which, through the springs L' moves the inner slides $k$, $k'$ etc., toward the left, said inner slides moving the outer U-shaped slides K', K², etc., also to the left.

The locking bars $h^3$ are operated by and move in unison with the inner slides $k$, $k'$, etc.; but if a key of the second, or other order is depressed as shown in Figs. 8 and 10, the locking bar $h^3$ of the second order engages and is stopped by the key-lever N of the second order, thereby stopping and limiting the left hand movement of the inner slide $k'$ at the end of one space, so that the rack-arm $f^6$ will not be overlapped thereby and the rack F' is free to move upward.

The U-shaped slide of the second order K² also has been moved to the left until its right hand arm engages the inner slide $k'$ and is stopped thereby at the end of a one-space movement.

The outer U-shaped slide K' of the first order also moves toward the left in unison with the second order U-shaped slide and is stopped thereby at the end of a one-space movement, while the inner slide $k$ moves to the left with its outer slide one space and then continues to move to the left one space more until it is stopped by contact with the left hand arm of its U-shaped slide K', so that said inner slide $k$ has moved toward the left two spaces, which carries the arm $l$ on said inner slide over the rack-arm $f^6$ and thereby prevents the first order rack from moving upward. The arm $g'$ of the slide plate G on said rack not being overlapped by said arm $l$ is permitted to move upward until stopped by the flange $f^5$, thus allowing the right hand type lever B' to elevate its type-carrier sufficiently to bring a zero type to the printing line beside the 5 type on the next higher order type carrier. The slides $k^2$, $k^3$, $k^4$, $k^5$ and $k^6$ are also simultaneously moved toward the left far enough to have their arms 3, 4, and 5 overlap the arm $f^6$ on the racks F², F³, F⁴ and F⁵, and to overlap the arms $g'$ on the plates G slidable on said racks, so that none of said racks and plates can move when the printing mechanism is actuated, which prevents the printing of zeros to the left of the left hand numeral.

The cross-arms T' of said accumulator mechanism rotate in unison with the detent shafts H', etc., until the shaft H², stopped by the detent $h$ representing the numeral 5, engages the depressed key-lever N as shown in Fig. 10, and when the segmental plate W engages the lever X⁴ (see Figs. 2, 2-B, and 2-C) said lever X⁴ withdraws the upright post X³ from behind the slide-bar W³, which permits the centralizing mechanism Y, etc., to shift the accumulating mechanism to the position shown in Fig. 15, so that the cross-bars T' will engage internal teeth $s$ in the ring S², representing 5; and on the return movement of the actuating lever D' the main springs are permitted to draw the type-levers B' and racks F, F' downward, thus rotating the detent shafts to the left, and back to their normal position; the cross-arms T' rotating the accumulators Q forward 5 points, and displaying 50 on the wheel Q in the first and second orders.

On the forward movement of the actuating handle D', the arm D⁴ on the shaft D passes under the hinged end of the lever P' (see Fig. 7), and on the reverse movement of the actuating handle D' said arm D⁴ engages the cam-surface P³ (see Fig. 1) on the hinged end of the lever P' and operates said lever to move the slide-bar P toward the right so that the stud $p$ thereon will engage the dog-bars O' (see Fig. 10) and swing them out of engagement with the depressed key-levers N and allow them to return to their normal raised position.

To ensure the mechanism against careless manipulation of the key mechanism after the actuating mechanism is started in operation, the slides $k$, $k'$, etc., swing the locking-bars $h^3$ (see Figs. 8 and 10) upward so that the same will enter the notches $n'$ in the depressed key-levers N and pass under these key-levers N which are not depressed, so that it is impossible to depress a key during the operation of the actuating mechanism.

Next the key representing 6 in the second order is depressed, which swings the key-lever N downward so that it will engage the detent $h$ on the shaft $H^2$ corresponding to "6". The actuating mechanism is again operated as before, whereupon the different mechanisms function as described in relation to the printing of the first item, except that the accumulator wheel Q of the second order revolves far enough to display a "1", and in so doing the cam $q$ thereon operates the arm $a$ of the bell-crank lever Z (see Fig. 5) and causes the slide-bar $Z^2$ to withdraw its wedge-shaped shoulder $z^2$ (see Fig. 6) from under the rack $F^2$, thus permitting it to drop down a sufficient distance to rotate the detent shaft $H^3$ one point, which causes the accumulator wheel Q of the third order to rotate in unison therewith one point and display the numeral "1", thus showing the sum of 110.

When the slide-bar $Z^2$ is withdrawn, as above described, the spring-pressed dog $Z^3$ engages the ratchet tooth $z^3$ and retains the bar $Z^2$ until the next movement of the actuating mechanism, which releases said bar as hereinbefore described, which movement of the actuating mechanism causes the slides 14 (see Figs. 1 and 6) to move rearwardly and force their wedge-shaped shoulders 15 under the racks to lift them so that the wedge-shaped shoulders $z^2$ on the slide-bars $Z^2$ can freely re-enter thereunder.

*Subtracting operation.*

We will now subtract 11. The keys "1—1" in the first and second orders are depressed, and the subtracting key 19 is depressed, which shifts the detent shafts $H'$, etc., rearwardly, carrying therewith the pinion gears J from mesh with the rack-teeth $f^2$ into mesh with the rack-teeth $f^3$ (see Fig. 9). The actuating mechanism is then operated, which permits the elevation of the racks F and F' so that the type "1" of the first and second order are raised to the printing line, and the detent shafts are reversely rotated toward the left until the "—1" detents $h$ thereon engage the depressed key-levers N.

Upon the return movement of the actuating handle D' a reverse motion is communicated to the accumulator wheels by the shafts $H'$ etc., as follows:

The first order accumulator wheel Q is turned backward through its associated detent shaft $H'$ to display the numeral 9, thereby causing the cam $q$ thereon to withdraw the bar $Z^2$ from under the second order rack F'. The second order rack, thereupon, moves downward and rests upon the base-plate, said movement representing the —1 plus the carry-over, equaling two units, thereby revolving the detent shaft $H^2$ of the second order, which revolves the second order accumulator wheel Q' backwards to display the numeral 9. This causes the cam $q$ on the second order accumulator Q' to withdraw the slide-bar $Z^2$ of the third order from under the third order rack $F^2$, thus allowing said rack to drop down upon the base-plate which causes the detent shaft $H^3$ of the third order to turn its associated accumulator wheel backward one unit to display a zero. The accumulator wheels now display a remainder of 99.

*Sub-total printing operation.*

The accumulator wheels Q of the machine thus displaying 99, we will depress the sub-total key 30, which, through the agency of the levers V, 23, $X^2$ and X', as shown by broken lines in Fig. 2-A, shifts the accumulator mechanism into disengaged position shown in Fig. 13, and simultaneously shifts the detent shafts into subtracting position. The actuating mechanism is operated, which releases the type levers B' and $B^2$ of the first and second order to move upwardly, which also moves the racks F and F' upwardly until the detent shafts $H'$ and $H^2$ of the first and second order have turned the cross-arms T' (see Figs. 13 and 16) toward the left until the stud $t'$ on said arms engages the stud $s^2$ on the wheel S and is stopped thereby, the bar $a$ (see Fig. 13) having entered between two of the internal teeth $s$ in the ring S, thereby retaining said ring and the accumulator wheels Q from rotating or disturbing the displayed numerals 99. The stopping of the detent shafts of the first and second orders by the engagement of the studs $s^2$ and $t'$ limits the upward movement of the racks F and F' and the first and second order type levers so that the numerals 99 will rest on the printing line; and on the reverse movement of the actuating mechanism the racks F and F' will rotate the detent shafts $H'$ and $H^2$ and cross-arms T' back to their normal position, and slide the accumulator mechanism back to the position shown in Fig. 15 with the numerals 99 still displayed. During this printing operation the actuating mechanism has moved the slides $k^2$, $k^3$, etc., toward the left so that the arms 3, 4, etc., thereon, overlap the arms $f^6$ and $g'$ on the said racks, and their associated slide-plates G, thereby preventing all the racks to the left of the rack of the second order from moving upward, so that there will be nothing printed to the left of the left hand numeral.

In the above described operation when the accumulator mechanism is shifted to the position shown in Fig. 13, the ring $S^2$ operates the bolt U' so that the locking-bars $h^3$ of the first and second orders are prevented from being swung upward by the slides of the first and second order $k$ and $k'$, which stopping of said locking-bars thus prevents the left hand movement of said slides so that they will not interfere with the vertical movement of the first and second order racks F and F'.

If it happens that a zero is displayed after a numeral to the right on one of the accumulator wheels Q, the recess $s^3$ (see Fig. 18) in the ring S will coincide with the bolt U', and when the accumulator mechanism is shifted to the position shown in Fig. 13, said bolt will enter said recess and will not be operated, so that the slide $k$ will move toward the left with its arm $l$ overlapping the arm $f^2$ on the rack F, as shown in Fig. 9, and permit the plate G thereon to move upward to engage the flange $f^5$ on said rack, thus allowing the type lever of the first order to present a zero to the printing line.

*Total printing operation and clearing of the machine.*

If the total key 36 (see Figs. 2 and 2-A) is depressed, the levers W', $X^2$, $x$ and 38 are moved to the positions thereof shown by broken lines in Fig. 2-A, the lever $x$ (see Fig. 2) withdrawing the post $X^3$ from behind the slide $W^3$, the lever $X^2$ engaging the arm 19 which causes the slide-bar 23 to swing the lever V backward for the purpose of shifting the accumulator mechanism from the position thereof shown in Fig. 15 to that shown in Fig. 13, which disengages the wheel S from the cross-arms T' and causes it to be engaged by the arm $a$ so that said wheel and the accumulator wheel Q will be locked against rotation, and will continue to display the accumulated sum of 99. The rearward movement of the slide-bar 23 carries the stud-screw 25 against the lever 28 and swings the same to the rear, which, through the transverse rod 29 shifts the detent shafts H', etc., rearwardly to their subtracting position, as hereinbefore described.

The actuating mechanism is now operated by the handle D' which causes the segmental plate W (see Fig. 2) to swing forward and operate the slide-bars $W^2$ and $W^3$, as described. When the slides $W^2$ and $W^3$ are moved forwardly by the actuating mechanism as described, the stud 45 on the slide $W^2$ (see Fig. 2-A) releases the latch 43 so that it will engage the stud 44 on the lever 28 and retain it and the detent shafts H', etc., in subtracting position until released by the backward movement of the slide $W^2$ on the reverse movement of the actuating mechanism.

The forward rotation of the actuating shaft D swings the slidable cam-segment 40 forward, so that the cam-surface 39 on the cam-segment 40 (see Fig. 2-A) moves behind the depressed lever 38, which forces the cam-segment 40 longitudinally on the shaft D so that the cam-surface $40^a$ on cam-segment will engage the lever 42 and cause it to withdraw the arm 19 from behind the lever $X^2$ so that the centralizing mechanism Y, etc., (see Fig. 7) can shift the levers V and accumulator mechanism back to the engaged position shown in Fig. 15.

This forward movement of the actuating mechanism has caused the type levers of the first and second orders to raise their types "99" to the printing line, as hereinbefore described, and has released the hammer E' to strike the types. The detent shafts H' and $H^2$ of the first and second order have been rotated to the left, as described in the operation of subtraction, so that the cross-arm T' (see Fig. 16) will have entered the internal teeth $s'$ corresponding to the zeros on the accumulators Q of the first and second orders, and on the reverse movement of the actuating mechanism the type levers move downward to their normal positions and the detent shafts H' and $H^2$ rotate toward the right, thus causing the accumulator wheels Q of the first and second orders to rotate to the right in unison therewith 9 points to display the zeros thereon, thus clearing the accumulators.

Having thus fully shown and described my invention, I do not desire to be limited to the exact construction and arrangement of mechanism shown and described, as many alterations and modifications can be made therein without departing from the scope of my invention; therefore what I claim as new and desire to secure, is:—

1. In an adding and recording machine, printing mechanism comprising independently actuated type carriers, rotatable members operated by said printing mechanism and adapted to control the movement of said type carriers, detents on said rotatable members, manually manipulated mechanism adapted to be operated to engage said detents and thereby limit the rotation of said members, and actuating mechanism adapted to operate said printing mechanism.

2. In an adding and recording machine, printing mechanisms, rotatable members to correspond with the different numerical orders, mechanisms connected with said printing mechanisms and adapted to rotate said rotatable members in either direction, manually manipulated mechanism to cause said members to rotate in the direction desired, actuating mechanism adapted to cause said printing mechanisms to operate, and means to return said rotatable members to their initial position from either direction at each operation of the actuating mechanism.

3. In an adding and recording machine, printing mechanisms, rotatable members slidably mounted in the machine frame, a double rack mechanism for each numerical order connected to the said printing mechanisms, a pinion gear on each of said rotatable members adapted to intermesh successively with either rack of each of said double racks, manually manipulated mechanism adapted to shift said rotatable members and pinions longitudinally, accumulator mechanisms corresponding to the several numerical orders adapted to be rotated by said rotatable members to make additions, mechanisms actuated by said accumulator mechanisms adapted to control the printing mechanisms to record said additions, and actuating mechanism adapted to operate said printing mechanisms, substantially as described.

4. In a machine of the class described, comprising independently actuated type carriers and accumulator mechanisms, rotatable members mounted in the machine frame, means to rotate said members in either direction, two series of radial detents on each of said rotatable members, and manually manipulated mechanism adapted to engage detents in either series on said rotatable members and limit either the right or left rotation of the same and thereby control the action of said printing and accumulating mechanism, and actuating mechanism adapted to impart motion to said mechanism, substantially as set forth.

5. In a machine of the class described, printing mechanisms of the several numerical orders, rotatable, selective members operatably connected with said printing mechanisms, means to cause said rotatable members to rotate in one direction for additions, and in the opposite direction for subtraction, and accumulator wheels adapted to be rotated in either direction by said rotatable members, substantially as set forth.

6. In a calculating and recording machine, a gear member and an accumulator means for engaging or disengaging the one to or from the other, an independently actuated type carrier, a rack operated thereby and adapted to rotate said gear member in both directions, and means for holding the accumulator at rest during one movement of the gear, and permitting the accumulator to be rotated by the gear during its reverse movement.

7. In a calculating and recording machine, a gear member and an accumulator means for engaging or disengaging the one to or from the other, an independently actuated type carrier, a rack operated thereby and adapted to rotate said gear member in both directions, key mechanism to limit the movement of said rack, and means for holding the accumulator at rest during one movement of the gear and permitting the accumulator to be rotated by the gear during its reverse movement.

8. In a calculating machine, a pair of racks, a shiftable gear in continuous mesh with one of said racks, means for keeping said gear in mesh with one of said racks during the operation of the machine, and an accumulator in engagement with said gear during each semi-rotation thereof.

9. In a machine of the class described, printing mechanisms of the several numerical orders, rotatable members and associated gear mechanism adapted to regulate the movement of each of said printing mechanisms, accumulator mechanisms operatively connected to each of said rotatable members, a series of locking mechanisms adapted to be operated to cause the printing mechanisms to print zeros at the right of numerals, mechanism operatable by said accumulators to control the action of said locking mechanisms, and actuating mechanism adapted to operate said locking mechanisms, substantially as set forth.

10. In a machine of the class described, a recording mechanism, a mechanism for adding or subtracting, a rotary member actuated by said recording mechanism to control both of said mechanisms, detents on said member, a depressible key mechanism adapted to engage said detents to limit the movement of said rotary member, means to lock said key mechanism in its depressed position, and means operatable by any key in the same order to release said depressed key.

11. In a machine of the class described, a type-lever pivoted in the machine frame, a vertically movable spring-actuated member, means to connect the same to said type-lever, a key-controlled rotatable detent member adapted to limit the upward movement of said spring-actuated member and type-lever, and means adapted to release said type-lever to the action of said spring-actuated member, substantially as set forth.

12. In a machine of the class described, a type-lever pivoted in the machine frame, a vertically movable member, a plate slidably mounted on said vertically movable member, means to limit the movement of said plate on said member, a spring to yieldingly maintain said plate in a position toward one end of said vertically movable member, means to connect said plate to said type-lever, a spring connected to said plate and adapted to lift said slidable member, plate and type-lever upward, a key-controlled rotatable member adapted to limit the upward movement of said mechanism, and means adapted to release said mechanism to the action of the spring connected to said plate, substantially as set forth.

13. In a machine of the class described, a type-lever pivoted in a machine frame, a vertically movable rack-gear, a spring to move said rack upwardly, means to connect the same to said type-lever, a rotatable member mounted in the machine frame, a series of radial detent posts on said rotatable member arranged around the circumference thereof, a gear pinion secured on said rotatable member and intermeshing with said rack-gear, key mechanism adapted to be operated so as to engage one of said detent posts to limit the rotation of said rotatable member, and means adapted to release said type-lever to the action of said spring or operate the same against said spring, substantially as set forth.

14. In a machine of the class described, a plurality of type-levers, individual spring-actuated mechanism connected to each of said type-levers adapted to swing the same upward, actuating mechanism adapted to release said type-levers to the action of said spring-actuated mechanism or operate the same against said mechanism, and means to prevent said spring-actuated mechanism from raising the type to the printing line when there are no keys depressed and the actuating mechanism is operated, substantially as described.

15. In a machine of the class described, a plurality of type-levers each carrying a series of types from "0" to "9" inclusive, individual spring actuated mechanism connected to each of said type-levers, actuating mechanism adapted to release said type-levers to the action of said individual spring-actuated mechanisms or operate them against the same, key-controlled rotatable mechanisms adapted to limit the upward movement of said individual spring actuated mechanisms for the printing of numerals, and mechanism operatable by said actuating mechanism to cause the type-levers to raise the zero type at the right of the numerals to the printing line, and prevent the raising of the type-levers at the left of the numerals, substantially as set forth.

16. In a machine of the class described, a shaft, a gear pinion, two series of detents on said shaft, a row of keys in numerical order to co-operate with either series of detents, two gear racks, one of which is constantly in mesh with said gear for rotating said detent shaft, one of said racks being adapted to rotate the shaft so that one series of detents will co-operate with the keys, and the other adapted to rotate said shaft reversely so that the other series of detents will co-operate with said keys, and an accumulator rotatable with said shaft during the return semi-rotation thereof, depending on which rack is in mesh with said gear.

17. In a machine of the class described, printing mechanisms in several numerical orders, a rotatable detent member for each of said printing mechanisms, means connected to each of said printing mechanisms adapted to rotate said detent members to the right or to the left, key-mechanism adapted to be operated to co-act with said detent members to arrest the rotation at the point desired, accumulator mechanisms to correspond with the printing mechanisms operatively connected with said detent members, means adapted to lock the detent member operating means, and simultaneously to lock the key-mechanism, means operatable by the accumulator mechanism to control said locking means, substantially as set forth.

18. In an adding machine, recording devices comprising two relatively movable parts, type mounted on one of said parts, an actuating device operable to move said type carrying part to position to record "0" prior to any movement of the other part, means for moving both parts together to record the remaining numerals, and automatic means controlled by a depressed key to allow the presentation of a zero to the right of a numeral.

19. In a machine of the class described, comprising type levers and rotatable member to control the same, of a rack-gear connected to and operatable by said type levers, and a pinion gear on said rotatable member intermeshing with said rack-gear, substantially as set forth.

20. In a machine of the class described, a shiftable gear pinion, racks on opposite sides thereof and united for concurrent reciprocation, one of said racks being on a plane to the rear of the other rack, and means for keeping said pinion in constant mesh with one or the other of said racks during each entire reciprocation thereof.

21. In a machine of the class described, comprising printing mechanism, rotatable detent shaft mechanism, an accumulator mechanism actuated by said shaft, of a gear pinion on said shaft, racks on opposite sides of said pinion and united for concurrent reciprocation, one of said racks being on a plane to the rear of the other rack, and means for keeping said pinion in constant mesh with one or the other of said racks during each entire reciprocation thereof.

22. In a machine of the class described, independently actuated type carriers adapted to print items and totals, mechanism to add or subtract, a rotary member adapted to be rotated from "1" to "9" inclusive in either direction to control said mechanisms, and means to arrest said rotation at any point desired, substantially as described.

23. In a machine of the class described, comprising independently actuated type carriers adapted to print items and totals, accumulating mechanisms, and actuating mechanisms, of a rotatable member adapted to be rotated in either direction from one to nine points inclusive, and means to arrest said rotatable member at any of said points desired, substantially as described.

24. In a machine of the class described, comprising independently actuated type carriers adapted to print items and totals, accumulator mechanism and actuating mechanism, of a rotatable shaft, two series of nine detent posts each arranged around its circumference and along its length, means connected with said type carriers to rotate said shaft and accumulator mechanism, and means to selectively engage one of said detent posts and arrest the rotation of said shaft, substantially as set forth.

25. In a machine of the class described, comprising independently actuated type carriers adapted to print items and totals, accumulator mechanism and actuating mechanism, of a rotatable shaft, two series of nine detent posts, one for adding and one for subtracting, arranged around its periphery and along its length, said shaft controlling said type carriers and accumulator mechanism, means connected with said type carriers to rotate said shaft in either direction, means to shift said shaft longitudinally, means to selectively engage a detent post in either series on said shaft to arrest the rotation thereof, substantially as described.

26. In a machine of the class described, independently actuated type carriers adapted to print items and totals, actuating mechanism therefor, a rotatable detent shaft slidably mounted in the machine, manually operated means to longitudinally shift said shaft on its bearings, a key-board mechanism having depressible keys, means connected with said type carriers adapted to rotate said shaft in one direction when in its normal longitudinal position and in the opposite direction when shifted longitudinally, detents on said shaft adapted to engage said depressible key mechanism when rotated in either direction, substantially as set forth.

27. In a machine of the class described, actuating mechanism comprising a spring actuated transverse bar, type-levers adapted to be actuated by said bar, a transverse rockshaft, a bell-crank lever secured thereon, a manually operatable main shaft, a crank lever thereon, a link-bar terminally pivoted between said crank-lever and one arm of said bell-crank lever, and a rod connecting the other arm of said bell-crank lever and said spring actuated transverse bar, substantially as set forth.

28. In a machine of the class described, actuating mechanism comprising a transverse gathering-bar having lateral movement, type-levers adapted to be actuated by said bar, spring mechanism to move the same in one direction, a rock-shaft, a bell-crank lever secured thereon, a rod connecting the horizontal arm of said lever with said gathering-bar so that the spring movement of said bar is stopped by said arm of the bell-crank lever arriving at a dead center, a manually operatable shaft, and means operated thereby to rotate said bell-crank lever, substantially as set forth.

29. In a machine of the class described, mechanism adapted to accumulate additions and subtractions, a rotatable member to control said accumulator mechanism, independently actuated type carriers, and means operated by said type-carriers adapted to impart initial rotation to said rotatable member in either direction.

30. In a machine of the class described, a recording mechanism comprising independently actuated type carriers, accumulator mechanism, a rotatable member adapted to be returned to its initial position after each operation and to control said recording and accumulator mechanism, and means to transfer the amount of an accumulation to the recording mechanism to be recorded.

31. In a machine of the class described, mechanisms to record items in a plurality of numerical orders, accumulator mechanisms of different numerical orders, rotatable members, mechanism adapted to be actuated by said recording mechanism to control said recording mechanism and accumulator mechanism, and to return said rotatable members to their initial position after each operation, transfer mechanism adapted to be actuated by the accumulator mechanisms, to effect transfers from lower to higher orders, and means to transfer additions to the recording mechanism to be printed.

32. In a machine of the class described, independently actuated type carriers to record items in a plurality of numerical orders, accumulator mechanisms of different numerical orders, rotatable members to control said type carriers and accumulator mechanisms, means to return said rotatable members to their initial position after each operation, transfer mechanisms adapted to be actuated by said accumulator mechanism to effect transfers from lower orders to higher orders, and means to transfer additions to the recording mechanism to be printed, substantially as set forth.

33. In a machine of the class described, independently actuated type carriers to record items in a plurality of numerical orders, accumulator mechanisms of different numerical orders, longitudinally shiftable rotatable members to control said type carriers and accumulator mechanisms, mechanisms actuated by said accumulator mechanisms to effect transfers from accumulators of lower orders to accumulators of higher orders, and means to transfer the amounts of additions, or remainders of subtractions, to the type carriers mechanisms, substantially as described.

34. In a machine of the class described, independently actuated type carriers to record items, mechanism to accumulate additions or subtractions, a rotatable member adapted to control both of said mechanisms, and means to transfer the amount of the accumulator to said type carriers to be printed, and either leaving the accumulator mechanism set at zero or retaining the accumulation, substantially as set forth.

35. In a calculating machine, a gear member, means to rotate said gear member in either direction, an accumulator, means for engaging or disengaging said accumulator to and from said gear member during each operation, means for holding said accumulator at rest during a semi-rotation of said gear member, and means on the accumulator to limit the rotative movement of said gear member.

36. In a machine of the class described, a rotatable stud-shaft, cross-arms thereon, a rotatable shaft in axial alignment with said stud-shaft a non-rotatable shaft, a rotatable accumulator wheel on said non-rotatable shaft, a slidable and rotatable wheel on said non-rotatable shaft beside said accumulator wheel, means thereon to slidably engage said accumulator wheel whereby to cause said wheels to rotate in unison, a ring having ten internal grooves therein secured on said slidable wheel adapted to be engaged by said cross-arms when said slidable wheel is moved in one direction, and disengaged therefrom when moved in the opposite direction, and means to lock said accumulator wheel and slidable wheel at each extreme longitudinal movement of said slidable wheel, substantially as set forth.

37. In a machine of the class described, a non-rotatable shaft, an accumulator wheel rotatably mounted thereon, a wheel rotatable on said shaft in unison with said accumulator wheel and slidable on said shaft with relation to said accumulator wheel, means secured in said slidable wheel to slidably connect said wheels to rotate in either direction in unison, rotatable means adapted to engage with said slidable wheel at different degrees of its circumference to rotate said slidable wheel and said accumulator wheel in either direction, and be disengaged from said slidable wheel, and means to lock said wheels when disengaged from their rotating means.

38. In a machine of the class described, a recording mechanism, a rotatable member to control the same, a stud-shaft operatively connected to said rotatable member so as to be rotated thereby in either direction, a non-rotatable shaft in alignment with said stud-shaft, an accumulator wheel thereon, a slidable wheel on said non-rotatable shaft, means to slidably connect said wheels so that they will rotate in unison, means on said stud-shaft adapted to be engaged by said slidable wheel when the same is longitudinally shifted to its engaged position or disengaged therefrom when shifted to its extreme in either direction, and means to lock said wheels when shifted to either extreme longitudinal position, substantially as set forth.

39. In a machine of the class described, a recording mechanism, a rotatable detent shaft to control said recording mechanism, actuating mechanism, a non-rotatable shaft in axial alignment with said rotatable detent shaft, an accumulator wheel thereon, a wheel on said non-rotatable shaft and longitudinally shiftable thereon, a stud-shaft rotatably connected to said detent-shaft, means thereon adapted to be engaged by said slidable wheel in its intermediate longitudinal position whereby said slidable wheel is caused to be rotated in unison with said detent-shaft, means to slidably connect said wheel with said accumulator wheel, means actuated by said actuating mechanism to shift said slidable wheel out of engagement with said stud-shaft, in either longitudinal direction, and mechanism adapted to yieldingly maintain said slidable wheel in its intermediate engaged position, substantially as set forth.

40. In a machine of the class described, a printing mechanism, a rotary member rotatively actuated thereby, an accumulator adapted to be rotated by and to control the rotation of said rotary member and the operation of the printing mechanism, means to uncouple said accumulator from rotative movement with said rotatable member, means to lock said accumulator against rotation while so uncoupled, co-operating projections on said rotary member and accumulators to limit the rotation of said rotary member in the same direction as in addition, whereby the rotation of the rotary member and the movement of the printing mechanism is controlled to print an addition or remainder, substantially as set forth.

41. In a machine of the class described, an accumulator wheel, longitudinally shiftable means adapted to be shifted from its intermediate position in either direction to disengage said accumulator wheel from its operating means, a lever to operate said shiftable means, a cross-arm pivoted on said lever, and spring actuated slides adapted to maintain said lever in its vertical position, substantially as described.

42. In a machine of the class described, an accumulator wheel, longitudinally shiftable means adapted to be shifted from an intermediate position in either direction, a lever to shift said means, means connected to the actuating mechanism of the machine to operate said lever, a cross-arm on said lever, a pair of slides engaging each end of said cross-arm, stops adapted to be engaged by the outer ends of each of said slides, and springs to yieldingly press each of said slides against its respective stop, substantially as set forth.

43. In a machine of the class described, a rack, a plate to move in unison with said rack, a detent member, an adding and subtracting wheel co-acting mechanism on said rack and detent member, whereby said rack will rotate said detent member and adding and subtracting wheel, a type-lever, means to connect said plate and type-lever, means to lock said rack from motion and allow the plate and type-lever to move one unit, or to lock both rack and plate, substantially as set forth.

44. In a machine of the class described, a rack and plate adapted to move in unison, an adding wheel and a detent member adapted to be rotated by said rack, a type-lever connected to and operable by said plate, a stop adapted to limit the movement of said rack to one unit and allow the plate and type-lever to move one unit more, and means to withdraw said stop from under the rack and allow said rack and associated members to move also one unit more, substantially as set forth.

45. In a machine of the class described, an independently actuated type carrier, an axially shiftable gear pinion, racks on opposite sides and united for concurrent reciprocation, one of said racks being on a plane to the rear of the other rack whereby one of said racks will be in constant mesh with said gear pinion, an accumulator adapted for rotation in either direction by said gear pinion, means to connect said type carrier to said racks so that said type carrier will operate said racks, means to axially shift said gear pinion from mesh with one rack into mesh with the other rack, whereby the initial rotation of said pinion will be reversed, and means for keeping the accumulator uncoupled from said pinion during the initial movement thereof, and coupled to said pinion during the return revolution of said pinion.

46. In a machine of the class described, a plurality of shiftable gear pinions, racks on opposite sides thereof and united for concurrent reciprocation, one of said racks being in mesh with its pinion, and one of said racks being on a plane to the rear of the other so that said shiftable pinion will slip from one rack to the other, means for actuating said racks, an accumulator disengageably connected to each of said pinions, so that said pinions and accumulators will be given a limited rotary movement at each reciprocation of said racks, a cam shoulder on each accumulator, a removable base stop under each pair of racks, means actuated by said cam shoulder on an accumulator of a lower order adapted to remove said base-stop from under the rack of the next higher order whereby said rack is allowed to drop an extra space, thereby causing a further rotation to the right of said pinion and associated accumulator, when one rack is in mesh with said pinion or to the left when said pinion is shifted to mesh with the other rack.

47. In a machine of the class described, a series of accumulator wheels of different numerical orders, a cam on each of said accumulator wheels, shiftable gear pinions disengageably coupled to said accumulator wheels, rack gear mechanism adapted to mesh with said pinions from one side or the other thereof and capable of rotating said pinion in either direction, a removable base-stop under each rack gear mechanism, means adapted to be operated by an accumulator cam to withdraw said removable base-stop from under the next higher order rack mechanism, whereby said mechanism will rotate its pinion and coupled accumulator an extra point in either direction, depending on which side of the pinion is in mesh with said rack mechanism.

48. In a calculating and recording machine, a series of independently actuated type-carriers carrying type from "0" to "9" normally resting below the printing line, a gear rack connected to each type-carrier, actuating means therefor, locking mechanism for said racks adapted to lock the rack and permit the type-carrier to bring the "0" to the printing line, automatically actuated means to operate said locking mechanism, a depressible key-stop for preventing the locking of the rack and its connected type-carrier, a selective device geared to said rack and adapted to be controlled by said depressible key to bring the added number to the printing line, and means controlled by said key-stop to permit zeros to the right of a numeral, but not to the left thereof to come to the printing line, and hammer mechanism to strike the type at the printing line.

49. In a machine of the class described, comprising substantially a recording mechanism, accumulating mechanism, and mechanism adapted to rotate said accumulator mechanism in either direction, of two relatively movable members, one of which is adapted to control the movement of the zero and to prevent movement of the accumulator.

50. In a machine of the class described, a recording mechanism, an accumulating mechanism, of two relatively movable members, one of said members operating to allow the zeros to be brought to the printing line at the right of a numeral, and not to the left of a numeral, and a hammer mechanism adapted to strike the type at the printing line.

51. In a machine of the class described, recording mechanism, accumulating mechanism and totaling mechanism to print the accumulated amounts, of two relatively movable members for each numerical order, one of said members being adapted to permit the printing of zeros at the right and not at the left of numerals, and means operated by the accumulating mechanism to control said members.

In testimony whereof I affix my signature.

ABRAHAM SMITH.